(12) United States Patent
Takayama et al.

(10) Patent No.: US 10,870,077 B2
(45) Date of Patent: Dec. 22, 2020

(54) POROUS HONEYCOMB FILTER

(71) Applicant: DENSO CORPORATION, Kariya (JP)

(72) Inventors: Yasushi Takayama, Kariya (JP);
Shusaku Yamamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 16/452,937

(22) Filed: Jun. 26, 2019

(65) Prior Publication Data

US 2019/0314752 A1 Oct. 17, 2019

Related U.S. Application Data

(63) Continuation of application No. PCT/JP2017/045099, filed on Dec. 15, 2017.

(30) Foreign Application Priority Data

Dec. 27, 2016 (JP) .................. 2016-253334

(51) Int. Cl.
*B01D 46/24* (2006.01)
*B01D 39/20* (2006.01)
*C04B 35/195* (2006.01)
*C04B 38/00* (2006.01)

(52) U.S. Cl.
CPC ....... *B01D 46/247* (2013.01); *B01D 39/2075* (2013.01); *B01D 46/2429* (2013.01); *B01D 46/2455* (2013.01); *B01D 46/2474* (2013.01); *C04B 35/195* (2013.01); *C04B 38/0009* (2013.01); *C04B 38/0016* (2013.01); *B01D 2046/2433* (2013.01); *B01D 2239/1208* (2013.01); *B01D 2279/30* (2013.01); *C04B 2235/3436* (2013.01)

(58) Field of Classification Search
CPC ............ B01D 46/2429; B01D 46/2455; B01D 46/2474; B01D 2046/2433; B01D 2279/30
USPC .............................. 55/523; 428/116; 422/180
See application file for complete search history.

(56) References Cited

U.S. PATENT DOCUMENTS

| | | | | |
|---|---|---|---|---|
| 5,108,685 A | * | 4/1992 | Kragle ................... | B29C 48/30 264/177.12 |
| 9,073,289 B2 | * | 7/2015 | Tamai ................ | B01D 46/2474 |
| 9,156,742 B2 | * | 10/2015 | Hayashi ............... | B01D 46/247 |
| 9,403,339 B2 | * | 8/2016 | Murata ..................... | B32B 3/12 |
| 9,533,294 B2 | * | 1/2017 | Hayashi ................... | B01J 35/04 |
| 2004/0266619 A1 | * | 12/2004 | Bernas ................... | B29C 48/32 428/116 |
| 2014/0205794 A1 | * | 7/2014 | Tamai .................. | B01D 46/247 428/116 |

(Continued)

FOREIGN PATENT DOCUMENTS

| | | |
|---|---|---|
| JP | 11-082005 | 3/1999 |
| JP | 2002-317618 | 10/2002 |

(Continued)

*Primary Examiner* — Tom P Duong
(74) *Attorney, Agent, or Firm* — Nixon & Vanderhye P.C.

(57) ABSTRACT

Provided is a porous honeycomb filter comprising a porous first cell wall that permits exhaust gas to permeate, a second cell wall that permits exhaust gas to permeate than the first cell wall, and a cell that is surrounded by the first cell wall and the second cell wall to form an extending gas flow passage. The second cell wall has a smaller porosity than the first cell wall.

23 Claims, 18 Drawing Sheets

(56) References Cited

U.S. PATENT DOCUMENTS

| | | | | |
|---|---|---|---|---|
| 2014/0287192 A1* | 9/2014 | Murata | ............... | F01N 3/2828 |
| | | | | 428/117 |
| 2015/0004353 A1* | 1/2015 | Hayashi | ................. | B01J 35/04 |
| | | | | 428/116 |
| 2015/0273380 A1 | 10/2015 | Sakashita et al. | | |

FOREIGN PATENT DOCUMENTS

| | | |
|---|---|---|
| JP | 2007-224884 | 9/2007 |
| JP | 2011-177704 | 9/2011 |
| JP | 2011-194320 | 10/2011 |

\* cited by examiner

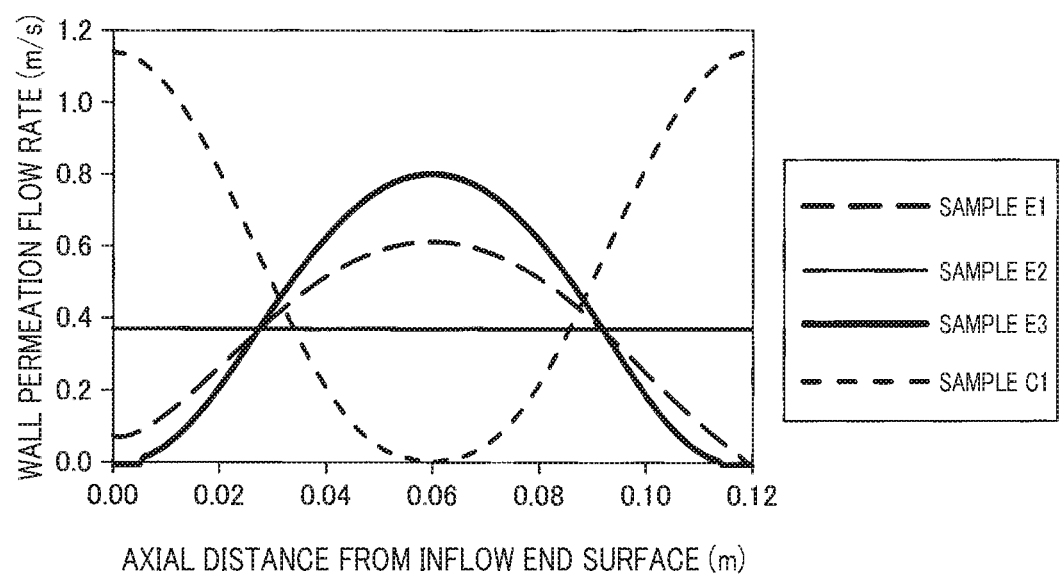

POROUS HONEYCOMB FILTER

CROSS-REFERENCES TO RELATED APPLICATION

The present application is a continuation application of International Application No. PCT/JP2017/045099, filed on Dec. 15, 2017, which claims priority to Japanese Patent Application No. 2016-253334, filed on Dec. 27, 2016. The contents of these applications are incorporated herein by reference in their entirety.

BACKGROUND

Technical Field

The present disclosure relates to a porous honeycomb filter.

Background Art

An exhaust pipe of an internal combustion engine is provided with an exhaust gas purification device for collecting particulate matter (PM) contained in exhaust gas. The exhaust gas purification device is provided with a porous honeycomb filter for collecting the PM contained in the exhaust gas.

SUMMARY

The porous honeycomb filter comprising: a porous first cell wall; a second cell wall; and a cell, the second cell wall has a smaller porosity than the first cell wall, a plurality of the first cell walls and a plurality of the second cell walls partition an inside of the tubular outer shell into a plurality of the cells, the first cell walls include an inclined wall extending inclined relative to an axial direction of the tubular outer shell, and the second cell walls include a parallel wall extending parallel to the axial direction.

BRIEF DESCRIPTION OF THE DRAWINGS

The above objective and other objectives, features, and advantages of this disclosure will be more apparent with the following detailed description with reference to the accompanying drawings, wherein:

FIG. 29 shows relationships between an axial distance from the inflow end surface of each porous honeycomb filter and the wall permeation flow rate in the experimental example.

DETAILED DESCRIPTION OF THE PREFERRED EMBODIMENTS

Figure 1:
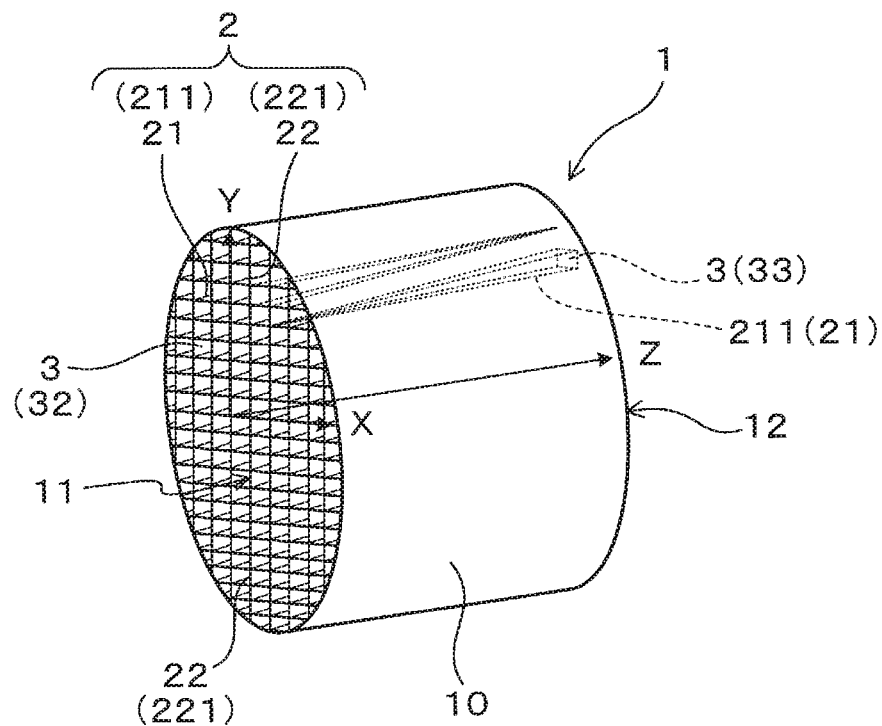
FIG. 1 is a perspective view of a porous honeycomb filter of a first embodiment.

The present disclosure relates to a porous honeycomb filter having a first cell wall that permits exhaust gas to permeate, and a second cell wall that has lower permeability to exhaust gas.

The porous honeycomb filter has a cell which is surrounded by a porous cell wall to form a axially extending gas flow passage. Some of the large number of cells are closed by a plug on an inflow end surface, while the remaining cells are closed by a plug on an outflow end surface. In a thus configured porous honeycomb filter, exhaust gas flows in from the cells whose inflow end surface is open, passes through the cell wall due to an internal pressure difference between the inflow cell and the outflow cell, and then is discharged from the cells whose outflow end surface is opened. The PM in the exhaust gas is collected at a time of passing the exhaust gas through the cell wall.

In the porous honeycomb filter described above, however, the passage area on the inflow end surface is reduced to half by the plug, which tends to create more pressure loss. In addition, the amount of gas permeating through a cell wall is largely different for each portion in the axial direction, so that gas permeation is concentrated in certain places, which creates more pressure loss. Against such a background, for example, Patent Literature 1 has proposed an exhaust gas purification device having a plurality of passages arranged in a grid pattern. Each passage, which extends from a corresponding one end surface to a corresponding other end surface or thereabout, has a triangular shape such that two opposite sides are tapered toward the deeper side of the corresponding passage.

The above exhaust gas purification device having triangular passages can create less pressure loss. Increasing the porosity of the cell wall more to raise the PM collection ratio, however, weakens it because its entire filter will be of uniform material and porosity. There is a risk that the device might be damaged at a time of canning or due to vibration. On the other hand, reducing the porosity of the cell wall to make it stronger may possibly lower the PM collection ratio or create more pressure loss.

The present disclosure aims to provide a porous honeycomb filter that is strong enough for practical use and achieves both low pressure loss and a high collection ratio.

The porous honeycomb filter according to one aspect of this disclosure comprising:

a porous first cell wall that permits exhaust gas to permeate;

a second cell wall that permits exhaust gas to permeate less easily than the first cell wall; and a cell that forms is surrounded by the first cell wall and the second cell wall to form an extending gas flow passage, wherein the second cell wall has a smaller porosity than the first cell wall, the cell comprises a plurality of cells, the porous honeycomb filter further comprising a tubular outer shell (10) constituting an outer periphery thereof, a plurality of the first cell walls and a plurality of the second cell walls partition an inside of the tubular outer shell into the cells, the first cell walls include an inclined wall (211) extending inclined relative to an axial direction (Z) of the tubular outer shell, and the second cell walls include a parallel wall (221) extending parallel to the axial direction.

The porous honeycomb filter according to other aspect of this disclosure comprising:

a porous first cell wall (21) that permits exhaust gas (G) to permeate;

a second cell wall (22) that permits the exhaust gas to permeate less easily than the first cell wall (21); and a cell (3) that is surrounded by the first cell wall and the second cell wall to form an extending gas flow passage, wherein the second cell wall has a smaller porosity than the first cell wall, the cell comprises a plurality of cells, the porous honeycomb filter further comprising a tubular outer shell (10) constituting an outer periphery thereof, a plurality of the first cell walls and a plurality of the second cell walls partition an inside of the tubular outer shell into the cells, in a cross section of the porous honeycomb filter in the direction orthogonal to the axial direction (Z) of the tubular outer shell, a cross-sectional area $S_a$ occupied by a plurality of the first cell walls and a cross-sectional area $S_b$ occupied by a plurality of the second cell walls satisfy the following condition:

$$S_a > S_b,$$

the number of the second cell walls is fewer than the number of the first cell walls.

The porous honeycomb filter according to another aspect of this disclosure comprising:

a porous first cell wall (21) that permits exhaust gas (G) to permeate;

a second cell wall (22) that permits the exhaust gas to permeate less easily than the first cell wall (21); and a cell (3) that is surrounded by the first cell wall and the second cell wall to form an extending gas flow passage, wherein the second cell wall has a smaller porosity than the first cell wall, the cell comprises a plurality of cells, the porous honeycomb filter further comprising a tubular outer shell (10) constituting an outer periphery thereof, a plurality of the first cell walls and a plurality of the second cell walls partition an inside of the tubular outer shell into the cells, in a cross section of the porous honeycomb filter in the direction orthogonal to the axial direction (Z) of the tubular outer shell, a cross-sectional area $S_a$ occupied by a plurality of the first cell walls and a cross-sectional area $S_b$ occupied by a plurality of the second cell walls satisfy the following condition:

$$S_a > S_b,$$

a thickness $T_1$ of each first cell wall and a thickness $T_2$ of each second cell wall satisfy the following condition:

$$T_1 < T_2.$$

The porous honeycomb filter described above has a first cell wall and a second cell wall. The first cell wall permits exhaust gas to permeate, thereby collecting PM in the exhaust gas. Adjusting the porosity of the first cell wall as appropriate can raise the collection ratio and prevent pressure loss from increasing. The porous honeycomb filter is hereinafter referred to as a "filter" as appropriate.

On the other hand, the second cell wall need not allow exhaust gas permeation and has a smaller porosity than the first cell wall. The second cell wall having a smaller porosity can improve the filter strength to a degree sufficient for practical use.

In the filter described above, the first and second cell walls can be thus provided with a different function, respectively. Specifically, the first cell wall can collect PM while suppressing the increase in pressure loss, while the second cell wall can be strong enough for practical use.

As described above, the aspect can provide a porous honeycomb filter that is strong enough for practical use and achieves both low pressure loss and a high collection ratio.

First Embodiment

An embodiment of a porous honeycomb filter will be described with reference to FIGS. 1 to 15. As illustrated in FIG. 1, a filter 1 has a first cell wall 21, a second cell wall 22 and a cell 3. In the present specification, a wall surrounding the cell 3 serving as a gas flow passage, such as the first cell wall 21 and second cell wall 22, is referred to as a cell wall as appropriate.

The first cell wall 21 is a porous cell wall that permits exhaust gas to permeate. The "first cell wall" is hereinafter referred to as a "permeable cell wall". The filter 1 is configured such that exhaust gas G flowing thereinto permeates through the permeable cell wall 21. The formation pattern of the permeable cell wall 21 is not particularly limited as long as the exhaust gas G permeates through the permeable cell wall 21.

An impermeable cell wall 22 is less permeable to exhaust gas G than the permeable cell wall 21. The "second cell wall" is hereinafter referred to as an "impermeable cell wall" as appropriate. The filter 1 is configured such that the exhaust gas G flowing into the filter 1 hardly permeates or practically fails to permeate through the impermeable cell wall 22. The formation pattern of impermeable cell wall 22 is not particularly limited as long as the exhaust gas G fails to permeate through the impermeable cell wall 22. The impermeable cell wall 22 has a smaller porosity than permeable cell wall 21. The impermeable cell wall 22 may be porous, but not necessarily, and may be a non-porous, or dense body.

The exhaust gas permeability of the permeable cell wall 21 and that of the impermeable cell wall 22 can be measured and thereafter compared with each other, for example, as follows. First, plate-like test pieces are respectively cut out from the permeable cell wall 21 and impermeable cell wall 22 of the filter 1. Each test piece separates a given space into a low-pressure space that is kept in a vacuum state, and a high-pressure space into which a test gas has been introduced. Then, the degree of gas permeability of each test piece can be measured by measuring the degree of pressure increase in the low-pressure space for the corresponding test piece. This enables the permeability of the permeable cell wall 21 and that of the impermeable cell wall 22 to be measured and compared with each other.

As illustrated in FIG. 1, the filter 1 may be, for example, cylindrical, but may be other columnar bodies such as an elliptical column, a triangular column, or a square column. The filter 1 has a tubular outer shell 10 that is, for example, cylindrical and is open-ended on both sides, and a cell wall 2 that partitions the inside of the tubular outer shell 10. The axial direction of the tubular outer shell 10 is an axial direction Z of the filter 1. The axial direction Z generally coincides with the elongation direction of the cell 3, which forms the gas flow passage, the direction of the exhaust gas G flowing into the filter 1, the direction of the exhaust gas G flowing out of the filter 1, the direction of the exhaust gas G flowing through the cell 3.

Figure 5:
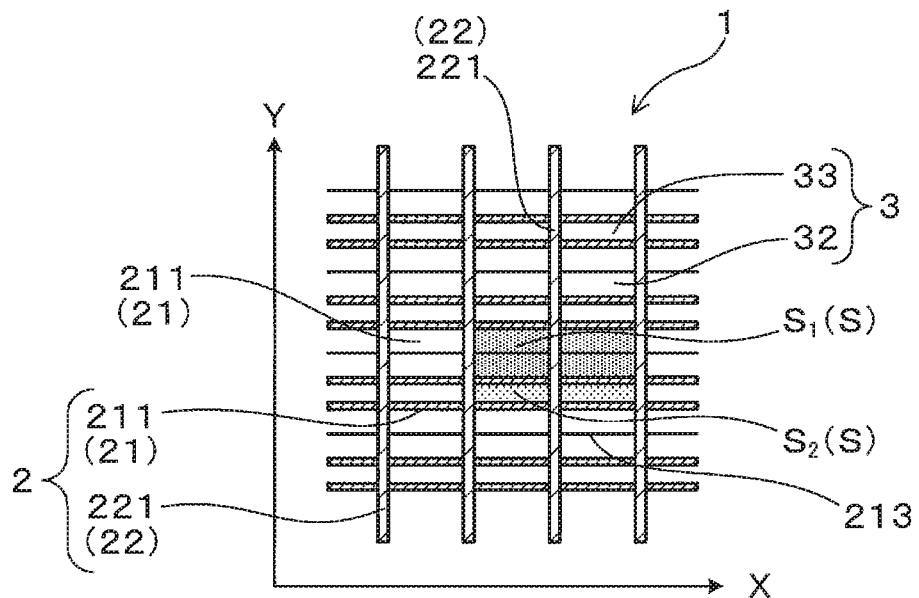
FIG. 5 is a partial enlarged view of the XY cross section at a position near the inflow end surface of a porous honeycomb filter of the first embodiment.
Figure 6:
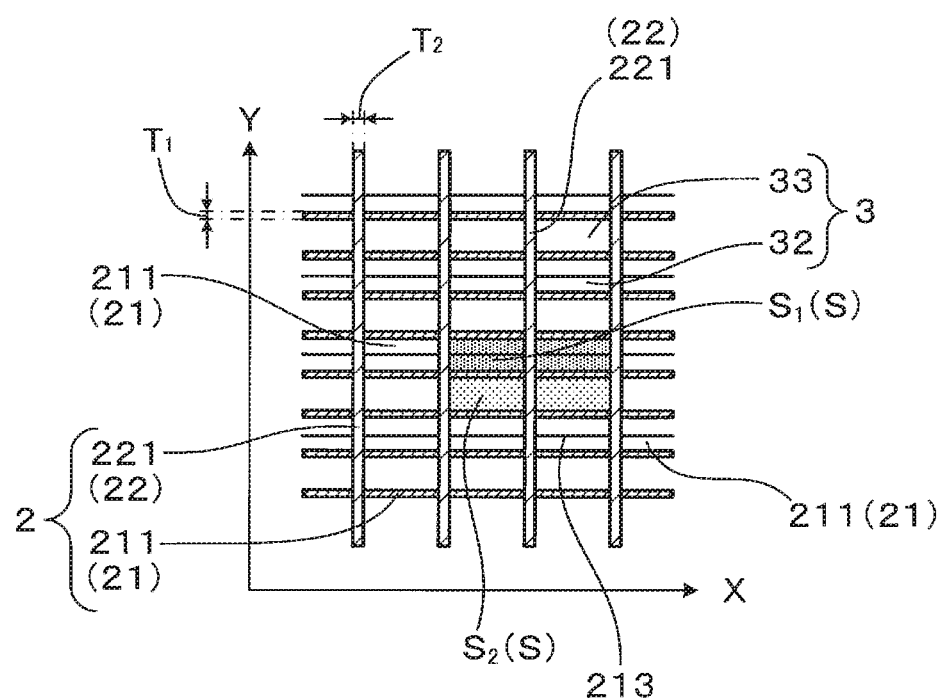
FIG. 6 is a partial enlarged view of the XY cross section at a center position along the axial direction of a porous honeycomb filter of the first embodiment.
Figure 7:
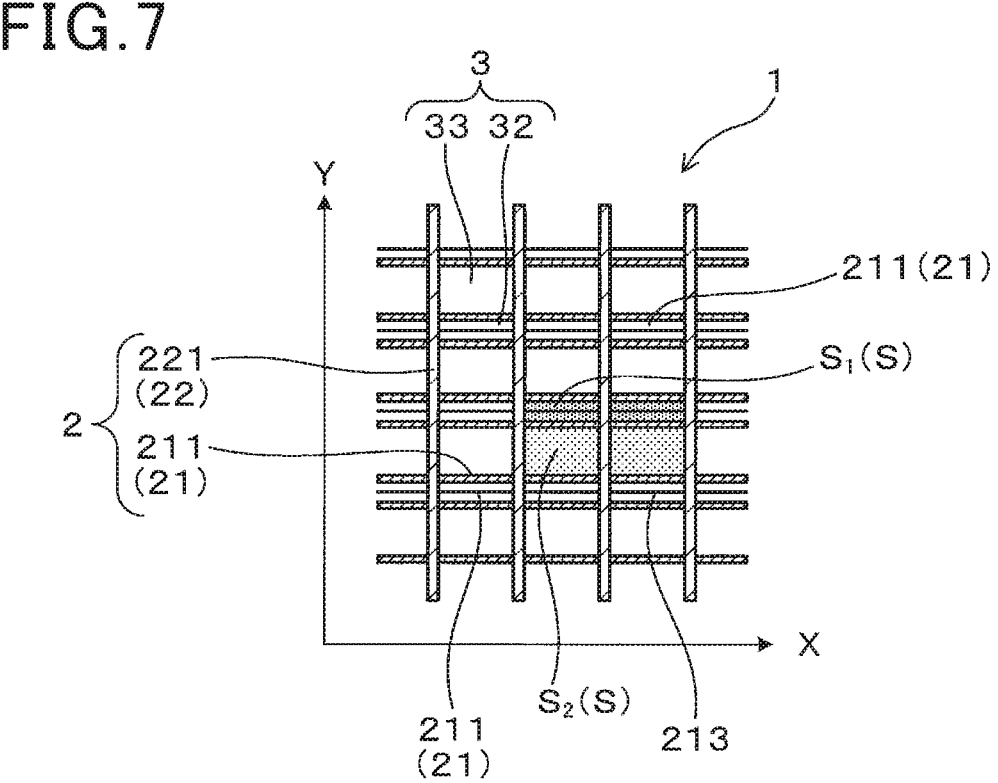
FIG. 7 is a partial enlarged view of the XY cross section at a position near the outflow end surface of a porous honeycomb filter of the first embodiment.

Cells 3 adjacent via a permeable cell wall 21 preferably each have a different gas flow passage cross-sectional area S at an arbitrary position in the axial direction Z (see FIGS. 5 to 7). This can create an internal pressure difference between the cells 3 adjacent via the permeable cell wall 21. As a result, the exhaust gas G permeates through the porous permeable cell wall 21, thereby collecting PM in the permeable cell wall 21. Although specifically described below, a reduction cell 32 and an enlargement cell 33 can be arranged adjacent to each other via, for example, an inclined wall 211, which is inclined relative to the axial direction Z. In the cross section illustrated in FIGS. 5 to 7, dot hatching regions with high density and dot hatching regions with low density are adjacent to each other via the permeable cell wall 21, and the areas $S_1$ and $S_2$ of these hatching regions are different from each other. This difference in area means that the cells 3 adjacent to each other via the permeable cell wall 21 each have a different gas flow passage cross-sectional area S.

On the other hand, the cells 3 adjacent to each other via the impermeable cell wall 22 can have an identical gas flow passage cross-sectional area S at any arbitrary position in the axial direction Z. This fails to create an internal pressure difference between the cells 3 adjacent via the impermeable cell wall 22. As a result, the exhaust gas G hardly permeates or practically fails to permeate through the impermeable cell 22. As specifically described below, reduction cells 32 and enlargement cells 33 can be arranged adjacent to each other via, for example, a parallel wall 221 extending in parallel to the axial direction Z. The cross section illustrated in FIGS. 5 to 7 corresponds to the relation of the gas flow passage cross-sectional area between each of the cells 3 in which the dot hatching regions with high density are adjacent to each other via the impermeable cell wall 22. The same applies to the dot hatching regions with low density.

As illustrated in FIGS. 1, 2 and 4 to 9, the permeable cell wall 21 may be formed by, for example, the inclined wall 211. The inclined wall 211 is inclined relative to the direction in which the exhaust gas G flowing in the cell 3. FIG. 1 is a perspective view of a filter, where the cell walls inside the filter are supposed to be hidden in the drawings, but the formation pattern of some inclined walls 211 is shown with a dotted line for convenience of description.

On the other hand, the impermeable cell walls 22 may be formed by parallel walls 221 extending in parallel to the direction in which the exhaust gas G flows, as illustrated in, for example, FIG. 3 and FIGS. 4 to 8.

Reducing the porosity of the impermeable cell wall 22 can strengthen the filter 1. In this case, the strength needs to be guaranteed only in a direction orthogonal to the axial direction Z, such as in the Y-axis direction. Thus the structure formed by the impermeable cell wall 22 is preferably as small in volume as possible so that the structure does not resist the gas flow. It is hence preferable that the impermeable cell walls 22 are formed by the parallel walls 221 as described above and that the parallel walls 221 are parallel to the axial direction Z and orthogonal to the inclined walls 21. However, as long as the required specifications of the filter 1 are satisfied, the impermeable cell wall 22 may not necessarily be parallel to the axial direction Z, and may include minute inclination or a corrugated part formed at a time of molding and sintering.

The outer edge of the cell 3 at the both end surfaces 11, 12 in the axial direction Z of the filter 1 can be shaped as a polygon such as a triangle, a square, a rectangle, a hexagon, and an octagon. The cell 3 can also be circular or elliptical.

The same also applies to the outer edge of the cell 3 in a cross section orthogonal to the axial direction Z.

If the outer edge of the cell 3 is polygonal, at least one cell wall 2 of the plurality of cell walls 2 surrounding each cell 3 can be inclined to form an inclined wall 211. The outer edge of the cell 3 is preferably shaped as a polygon having two opposing edges. Preferably, two opposite cell walls 2 surrounding each cell 3 are inclined so that corresponding two inclined walls 211 are created. This can narrow a variation in the flow rate of the exhaust gas G passing through the inclined walls 211 to further reduce the pressure loss. From a similar perspective, the outer edge of the cell 3 is more preferably quadrate as illustrated in FIG. 1. More preferably, a pair of opposing inclined walls 211 are inclined so that the wall surface distance between the walls 211 becomes smaller toward either one of the both end surfaces 11, 12.

The filter 1 having a permeable cell wall 21 including an inclined wall 211 and an impermeable cell wall 22 including a parallel wall 221 will be described in detail below. The "parallel wall" is referred to as a "support wall". In the following description, the direction orthogonal to the Z-axis direction and parallel to the wall surface of support wall 221 is defined as a Y-axis direction, and the direction orthogonal to both Z-axis direction and Y-axis direction is defined as an X-axis direction. The filter cross section in a plane having X and Y axes is defined as an XY cross section, the filter cross section in a plane having Y and Z axes as a YZ cross section, and the filter cross section in a plane having X and Z axes is defined as an XZ cross section.

Figure 2:
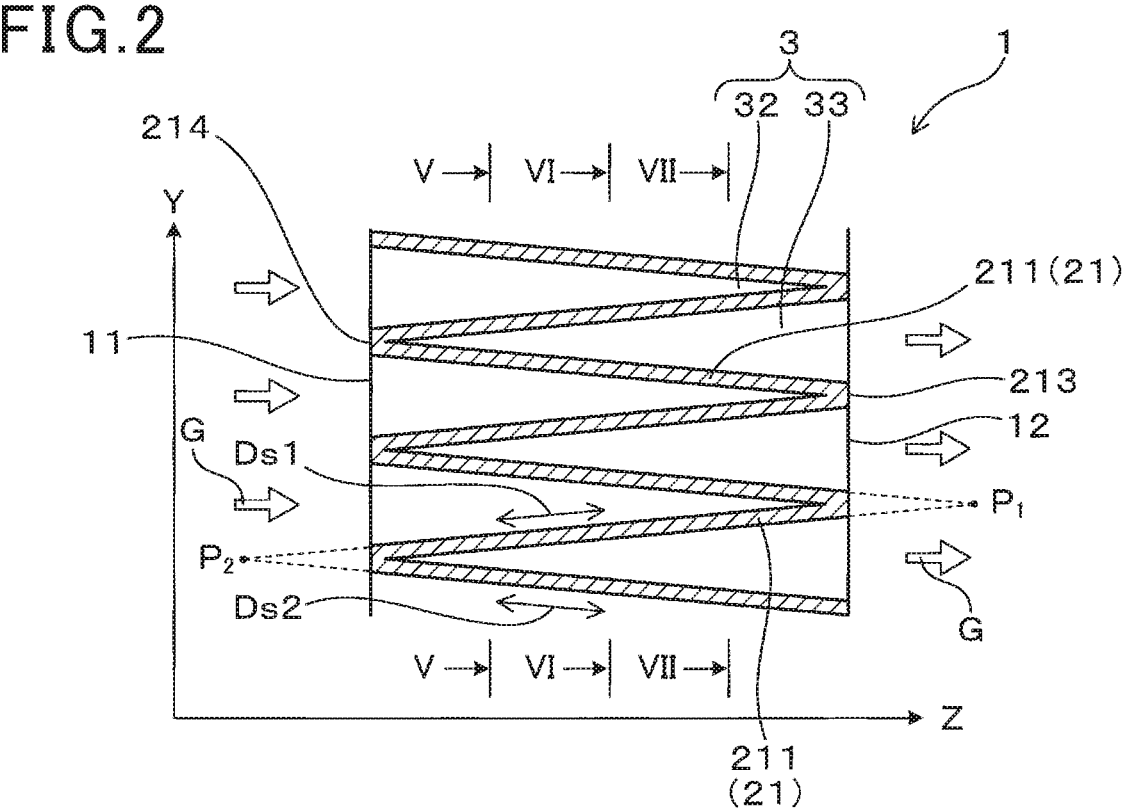
FIG. 2 is a partial enlarged view of the YZ cross section of a porous honeycomb filter of the first embodiment.

FIG. 2 shows a cross section of the filter 1 in the YZ plane parallel to the direction in which the exhaust gas G flows, specifically, in the plane including the axial direction Z of the filter 1 and the Y-axis direction parallel to a wall surface of the support wall 221. As illustrated in FIG. 2, the permeable cell wall 21 has an inclined wall 211 extending obliquely relative to the axial direction Z. The inclined wall 211 is inclined relative to the axial direction Z. The axial direction Z therefore intersects inclination directions Ds1 and Ds2 of the inclined wall 211. In FIG. 2, the inclination directions Ds1 and Ds2 are the inclination direction of inclined wall 211. The Y coordinate position of each inclined wall 211 varies, for example, continuously relative to the axial direction Z. A pair of opposing inclined walls 211 are continuously inclined so that, for example, the Y coordinate positions of the opposing inclined walls 211 approach each other toward either the end surface 11 or 12.

The inclined wall 211 may be formed on the entirety cell wall 2 in the elongation direction as illustrated in FIG. 2, or may be partially formed as shown in The third embodiment, which will be described below. The inclined wall 211 may be inclined in appearance to the axial direction Z. The inclination angle θ relative to the axial direction Z of the inclined wall 211 is not particularly limited, but it is preferably, for example, 0.9° or more (see FIG. 9). The upper limit of the inclination angle is, for example, 30°. The inclination angle θ can be adjusted as appropriate according to the dimension of the filter 1, a desired pressure loss and collection ratio, etc. The inclination angle of each inclined wall 211 may be fixed as in the present embodiment, or may be varied.

As illustrated in FIG. 2, a continuously and linearly inclined wall 211 may be formed as the permeable cell wall 21. Although illustration is omitted, an inclined wall can be formed having an intermittent inclination or a gradually changing inclination angle.

As illustrated in FIG. 2, the permeable cell wall 21 preferably has at least a pair of opposing inclined walls 211. The inclination directions Ds1 and Ds2 of the pair of inclined walls 211 are preferably symmetrical relative to the axial direction Z. In this case, the flow rates of the exhaust gas G passing through the pair of inclined walls 211 at a predetermined position in the axial direction Z can be less varied, thereby reducing the pressure loss. The respective PM amounts collected in the pair of inclined walls 211 are also less varied, thereby reducing temperature variation at a time of heating of the filter 1. The inclination directions Ds1 and Ds2 may be asymmetric relative to the axial direction Z.

As illustrated in FIG. 2, the inclination directions Ds1 and Ds2 relative to the axial direction Z of the inclined wall 211 are, for example, alternately reversed. This means that intersection points $P_1$ and $P_2$ of the inclination directions Ds1 and Ds2 of a pair of inclined walls 211 opposing as illustrated in FIG. 2 are alternately present on the opposite sides in the Z-axis direction.

Figure 3:
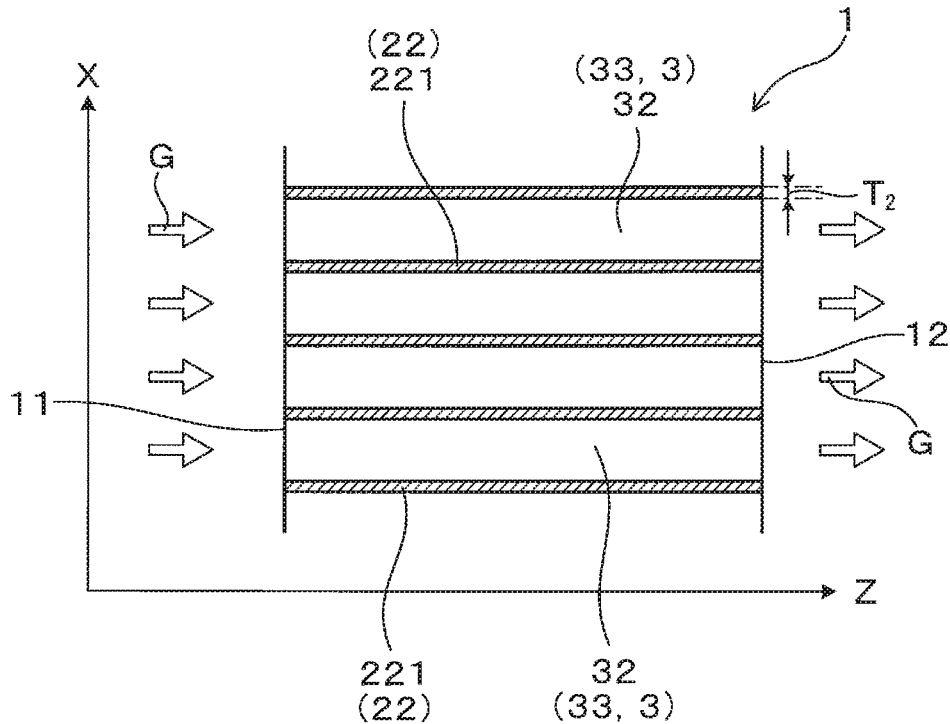
FIG. 3 is a partial enlarged view of the XZ cross section of a porous honeycomb filter of the first embodiment.

FIG. 3 shows a cross section of the filter 1 in the XZ plane parallel to a direction in which the exhaust gas G flows, and more specifically, in a plane orthogonal to wall surfaces of support walls 221, which shows a cross section of impermeable cell walls 22 including support walls 221. As illustrated in FIG. 3, an impermeable cell wall 22 includes a support wall 221 that extends in parallel to, for example, the axial direction Z. The X coordinate position of each support wall 221 remains unchanged (e.g., constant) relative to the axial direction Z. Similar to the inclined wall 211 described above, the support wall 221 may also be formed on a pair of opposing cell walls 2. The support wall 22 extending in parallel to the axial direction Z may be entirely parallel in appearance to the axial direction Z, and may include a minute inclination or a corrugated part that may be possibly formed at a time molding and sintering.

As illustrated in FIG. 1 and FIGS. 4 to 8, the support walls 221 is preferably orthogonal to the inclined walls 211 at the end surfaces 11, 12 and/or the XY cross section of the filter 1. This can further strengthen the filter. FIG. 5 shows an XY cross section of the filter 1 at an intermediate position between the center in the axial direction Z and an inflow end surface 11, viewed from the inflow end surface 11 side. The position and orientation of the XY section of FIG. 5 in the axial direction Z are respectively indicated by the line V-V and arrows in FIG. 2. FIG. 6 shows an XY section of the filter 1 at the center position of the axial direction Z, viewed from the inflow end surface 11 side. The position and orientation of the XY section of FIG. 6 in the axial direction Z are respectively indicated by the line VI-VI and arrows in FIG. 2. FIG. 7 shows an XY cross section of the filter 1 at an intermediate position between the center in the axial direction Z and outflow end surface 12, viewed from the inflow end surface 11 side. The position and orientation of the XY section of FIG. 7 in the axial direction Z are respectively indicated by the line VII-VII and arrows in FIG. 2.

As illustrated in FIGS. 4 to 8, the filter 1 has an inflow end surface 11 and an outflow end surface 12 for exhaust gas G respectively at both ends of the axial direction Z. The cells 3 each have a reduction cell 32 in which the cross-sectional area S of the gas flow passage in cells 3 becomes smaller from the inflow end surface 11 to the outflow end surface 12, and an enlargement cell 33 in which the cross-sectional area S of the gas flow passage in cells 3 becomes larger from the inflow end surface 11 to the outflow end surface 12. The reduction cell 32 and enlargement cell 33 are preferably arranged adjacent to each other sharing a single inclined wall 211. This arrangement makes it easier for the exhaust gas G to flow into the reduction cell 32, pass through the shared inclined wall 211, and be discharged from the adjacent enlargement cell 33, thereby improving the PM collection ratio and reducing the variation in collection ratio. Note that, in FIGS. 4 to 8, the gas flow passage cross-sectional area of the reduction cell 32 is denoted as $S_1$, while the gas flow passage cross-sectional area of the enlargement cell 33 is denoted as $S_2$. The gas flow passage cross-sectional area $S_1$ is the amount of area of the reduction cell 32 in a cross section orthogonal to the axial direction Z. The gas flow passage cross-sectional area $S_2$ is the amount of area of the enlargement cell 33 in a cross section orthogonal to the axial direction Z.

The reduction cell 32 may include a region in which the gas flow passage cross-sectional area $S_1$ is constant, and a region in which the gas flow passage cross-sectional area $S_1$ is smaller. The gas flow passage cross-sectional area $S_1$ may gradually decrease. Similarly, the gas flow passage cross-sectional area $S_2$ may gradually increase in the enlargement cell 33.

As illustrated in FIG. 2 and FIGS. 4 to FIG. 8, the reduction cells 32 and the enlargement cells 33 are formed alternately in the Y-axis direction on the XY plane, and are adjacent to each other in the Y-axis direction. On the other hand, the reduction cells 32 are adjacent to each other in the X-axis direction on the XY plane, and the enlargement cells 33 are adjacent to each other in the X-axis direction on the XY plane. Such an arrangement of the reduction cell 32 and the enlargement cell 33 causes the opposing inclined walls 211 to intersect on and be integrated with the end surfaces 11, 12 in the axial direction Z. Each inclined wall 211 is connected on the end surfaces 11, 12, whereby an integral structure is formed only by the inclined wall 211. As described later, a filter can be thus manufactured by, for example, extrusion molding, which makes it possible to improve mass productivity of the filter 1.

In addition, the reduction cells 32 and the enlargement cells 33 are arranged adjacent to one another to share a single inclined wall 211, as illustrated in FIG. 2 and FIGS. 4 to 8. Thereby, as illustrated in FIGS. 5 to 7, the reduction cell 32 and enlargement cell 33 adjacent to each other via the inclined wall 211 have regions where the gas flow passage cross-sectional areas $S_1$ and $S_2$ are different from each other. This creates an internal pressure difference occurs between the reduction cell 32 and enlargement cell 33 adjacent to each other via the inclined wall 211, which makes it possible to cause the exhaust gas G to permeate through the inclined wall 211.

In addition, the reduction cells 32 can be adjacent to each other via support wall 221, and the enlargement cells 33 can be adjacent to each other via support wall 221, as illustrated in FIG. 3 and FIGS. 5 to 7. As a result, the gas flow passage cross-sectional area $S_1$ of each reduction cell 32 adjacent to each other via the support wall 221 is identical at any position of the axial direction Z and the gas flow passage cross-sectional area $S_2$ of each enlargement cell 33 adjacent to each other via the support wall 221 is also identical, as illustrated in FIGS. 5 to 7, In this case, no internal pressure difference occurs between the reduction cell 32 and the enlargement cell 33, which causes the exhaust gas G to hardly permeate or practically fail to permeate through the support wall 221.

Figure 4:
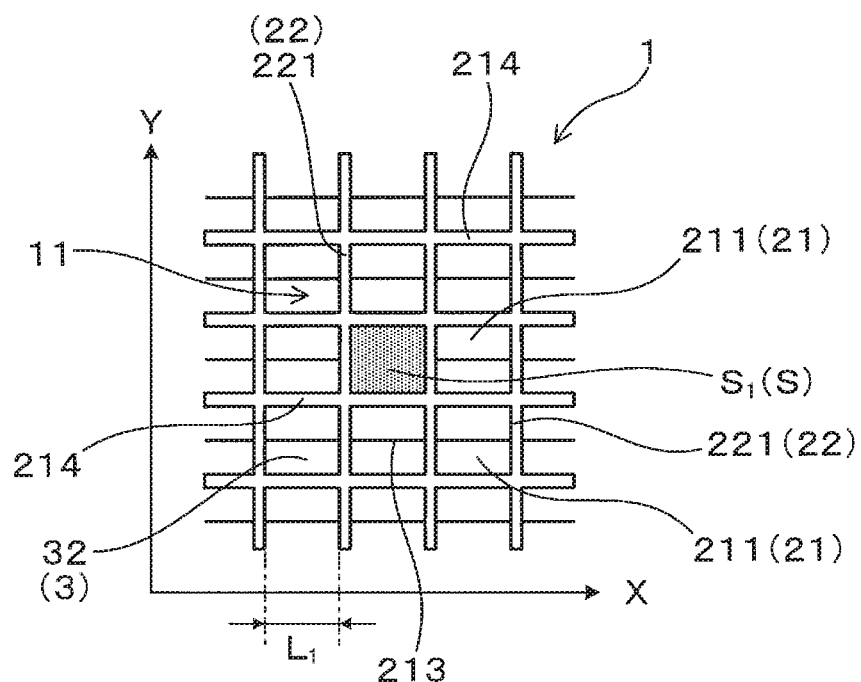
FIG. 4 is a partial enlarged view of the inflow end surface of a porous honeycomb filter of the first embodiment.

As illustrated in FIGS. 2 and 4, it is preferable that the gas flow passage cross-sectional area $S_1$ of the reduction cell 32 is maximized on the inflow end surface 11, and the reduction cell 32 is open on the inflow end surface 11. On the other hand, it is preferable that the gas flow passage cross-sectional area $S_2$ of the enlargement cell 33 is minimum on the inflow end surface 11, and the two opposing inclined walls 211 of the enlargement cell 33 are connected directly on the inflow end surface 11 to form an inflow-side connecting part 214. In this case, the enlargement cell 33 is closed by the inflow end surface 11, and the gas flow passage cross-sectional area $S_2$ is 0 at the inflow-side connecting part 214 of the inflow end surface 11. The opening area of the reduction cell 32, which serves as an inflow cell into which the exhaust gas G flows, becomes large on the inflow end surface 11, which can further reduce pressure loss.

Figure 8:
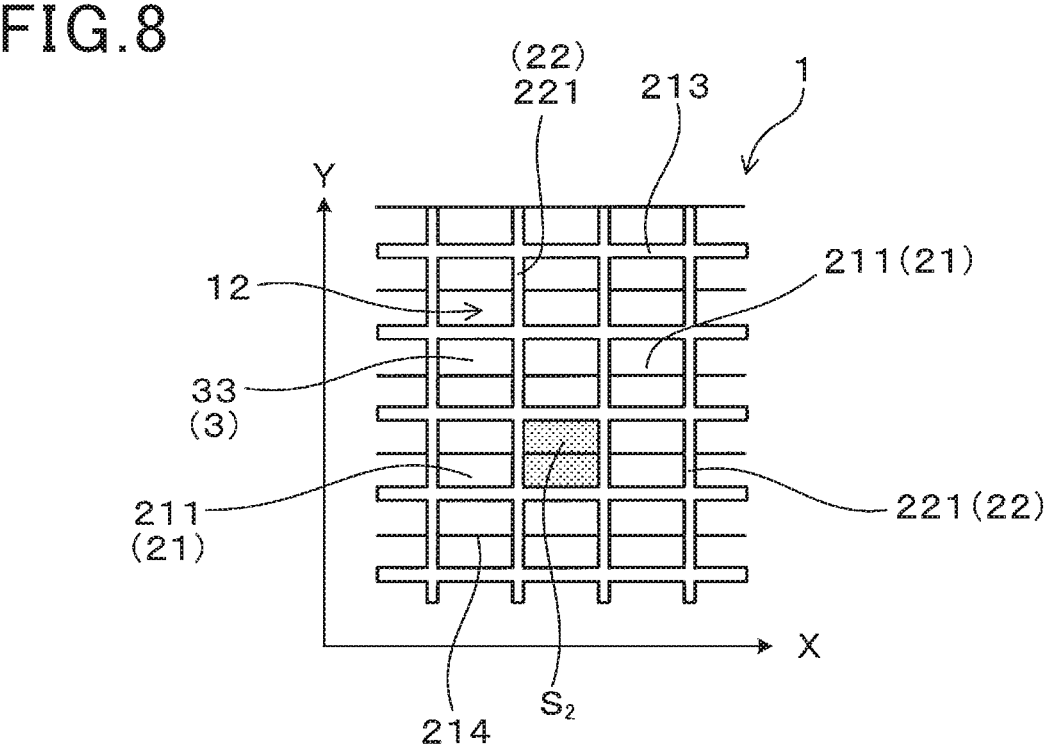
FIG. 8 is a partial enlarged view of the outflow end surface of a porous honeycomb filter of the first embodiment.
Figure 9:
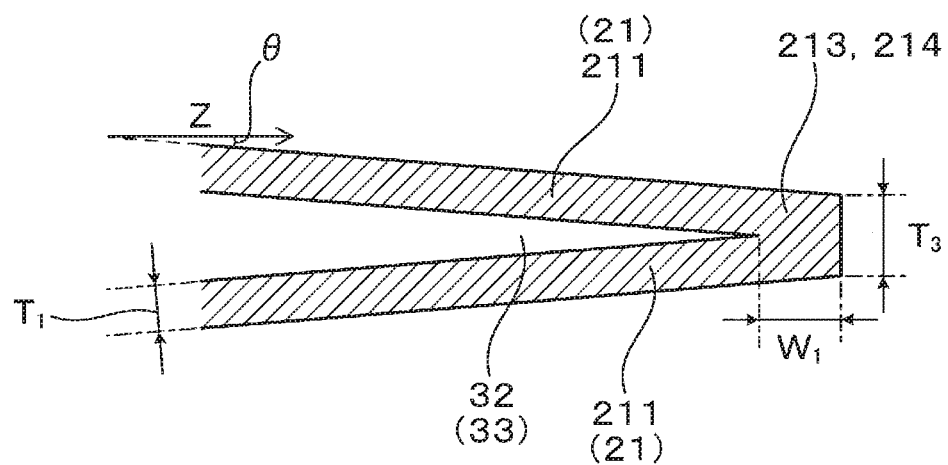
FIG. 9 is a partial cross-sectional enlarged view of a connecting part of an inclined wall in the first embodiment.

As illustrated in FIG. 2 and FIG. 8, it is preferable that the gas flow passage cross-sectional area $S_1$ of the reduction cell 32 is minimized on the outflow end surface 12, and the reduction cell 32 has two opposing inclined walls 211 connected directly on the outflow end surface 12 to form an outflow-side connecting part 213. In this case, the reduction cell 32 is closed by the outflow-side connection portion 213, and the gas flow passage cross-sectional area $S_1$ can be 0 at the outflow-side connecting part 213 of the outflow end surface 12. On the other hand, the gas flow passage cross-sectional area $S_2$ of the enlargement cell 33 is maximized on the outflow end surface 12, which can cause the enlargement cell 33 to be open on the outflow end surface 12.

Adjusting the inclination angle θ of a pair of opposing inclined walls 211 as appropriate can cause inclination directions to intersect on either the outflow end surface 12 or the inflow end surface 11 as described above. This can directly connect the pair of inclined walls 211 on the outflow end surface 12 or inflow end surface 11 where the inclination directions intersect.

Each cell 3 surrounded by each cell wall 2 and the both end surfaces 11, 12 assumes a triangular prism with a height in the X-axis direction. The reduction cells 32 and enlargement cells 33 are arranged alternately adjacent to one another in the Y-axis direction, i.e., in a direction parallel to the wall surface of each support wall 221 and orthogonal to the axial direction Z. The reduction cell 32 and enlargement cell 33 adjacent to each other share a single inclined wall 211.

The filter 1 is formed of a ceramic material such as cordierite, SiC, aluminum titanate, ceria-zirconia solid solution, alumina, and mullite. Cordierite is preferable due to its small thermal expansion coefficient and excellent heat shock resistance.

The permeable cell wall 21 that includes the inclined wall 211 and impermeable cell wall 22 includes the support wall 221 may be made of an identical or different material. For example, the permeable cell wall 21 can be made of a ceramic material such as cordierite, and the impermeable cell wall 22 can be made of metal. Preferably, both permeable cell wall 21 and impermeable cell wall 22 are made of a ceramic material whose main component is cordierite crystalline phase.

This can reduce the thermal expansion difference between the permeable cell wall 21 and impermeable cell wall 22, thereby preventing the occurrence of a defect such as a crack.

The porosity of the permeable cell wall 21 and the impermeable cell wall 22 can be varied by adjusting the raw material composition thereof and/or the particle diameter of each raw material powder or the like. The porosity can be compared and measured with a mercury porosimeter by a mercury penetration method. Mercury porosimeters can include the AutoPore IV 9500 manufactured by Shimadzu Corporation.

The impermeable cell wall 22 is preferably formed of a material that a strength per unit thickness is higher than the permeable cell wall 21. This further improves an effect of enhancing strength by the impermeable cell wall 22. The strength per unit thickness can be measured and compared, for example, by three-point bending strength evaluation using two support points and one load point, according to JIS R 1601:2008 "Fine Ceramics Bending Strength Test Method".

Figure 10:
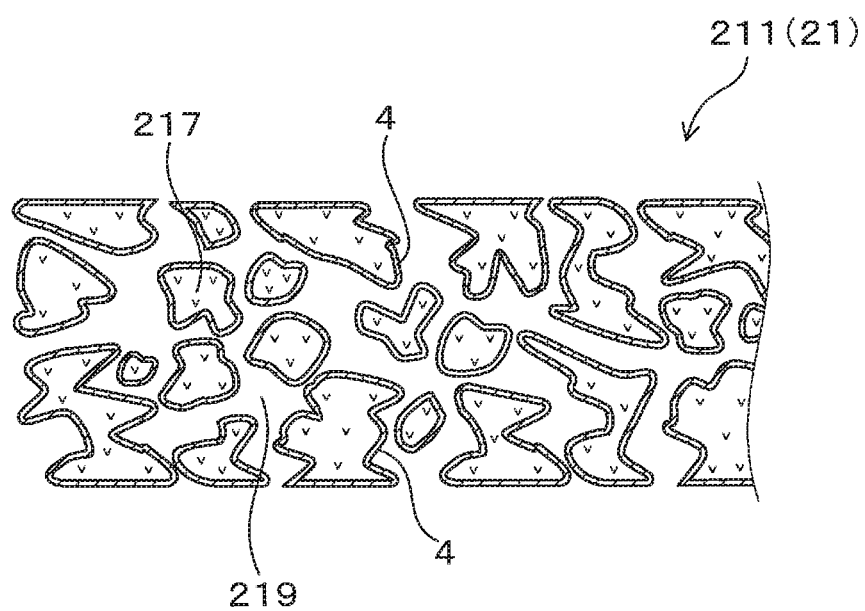
FIG. 10 is an enlarged cross-sectional view of an inclined wall in the first embodiment.
Figure 11:
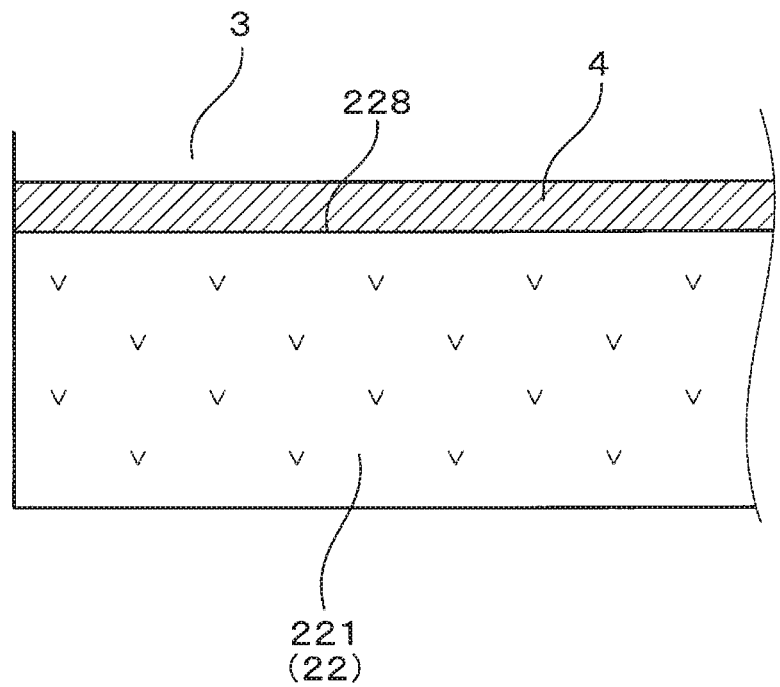
FIG. 11 is an enlarged cross-sectional view of a parallel wall in the first embodiment.

As illustrated in FIGS. 10 and 11, the permeable cell wall 21 and impermeable cell wall 22 can carry an exhaust gas purification catalyst 4. An illustrative catalyst 4 is a three-way catalyst containing a noble metal. A preferable noble metal is at least one of Pt, Rh and Pd due to their excellent catalytic performance.

As illustrated in FIG. 10, the permeable cell wall 21 carries the catalyst 4 inside thereof. The permeable cell wall 21 carries the catalyst 4 not only on the surface but also inside thereof because the permeable cell wall 21 has a high porosity. Specifically, the permeable cell wall 21 has many large pores 219, and the wall surface facing the pores 219 also carries the catalyst 4. The pores 219 each serve as a flow path for the exhaust gas passing through the permeable cell wall. For a better PM collection ratio and less pressure loss, the porosity of the permeable cell wall can range, for example, from 40 to 70%.

On the other hand, as illustrated in FIG. 11, the impermeable cell wall 22, which includes a support wall 221 with low porosity, carries the catalyst 4 on a surface 228 facing the gas flow passage, not inside thereof. The impermeable cell wall 22 fails to allow exhaust gas permeation, and therefore does not need to carry catalyst 4 inside the support wall 221. The porosity of the permeable cell wall 21 can be increased to an extent of carrying the catalyst inside thereof, while the porosity of the impermeable cell wall 22 can be reduced to an extent of carrying the catalyst on the surface 228. The porosity of impermeable cell wall is preferably less than 45%, and even more preferably 30% or less, to improve the strength of the filter 1. The impermeable cell wall may be a dense body, and the porosity of the impermeable cell wall may be 0.

The catalyst can be carried by a known method. An illustrative method is to immerse a filter in a liquid containing an exhaust gas purification catalyst or a precursor thereof and then baking the catalyst on the filter.

The filter 1 with the inclined wall 211 and the support wall 221 is manufactured, for example, in the following steps. The first step is to prepare cordierite raw material by mixing raw material powders such as silica, aluminum hydroxide, and talc to provide a cordierite composition. Kaolin, alumina, and others are also possible as the cordierite raw material. The composition of raw material powders can be adjusted so that the final composition after firing of the cordierite raw material may be, for example, $SiO_2$: 47 to 53 mass %, $Al_2O_3$: 32 to 38 mass %, and MgO: 12 to 16 mass %.

The next is to add water and methyl cellulose to the powdered cordierite raw material and knead the same to provide a clay-like body. Thickening agent, dispersant, organic binder, pore-forming material, surfactant, and the like can also be added to the body. This body is referred to as inclined wall forming body.

Figure 12:
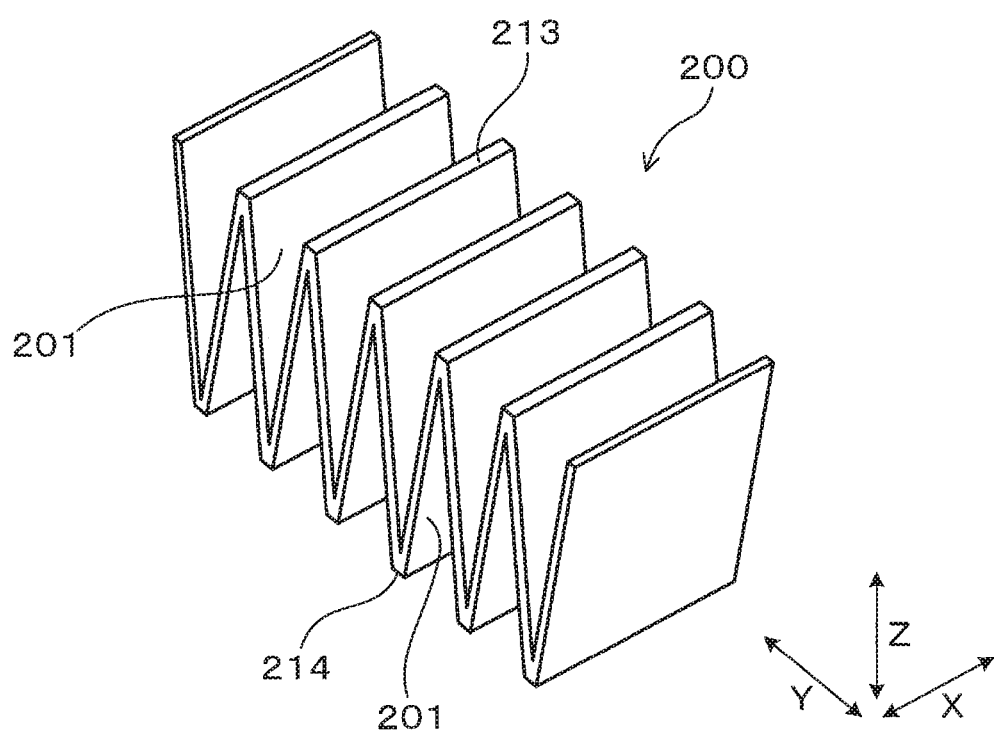
FIG. 12 is a perspective view of an inclined structure in the first embodiment.
Figure 13:
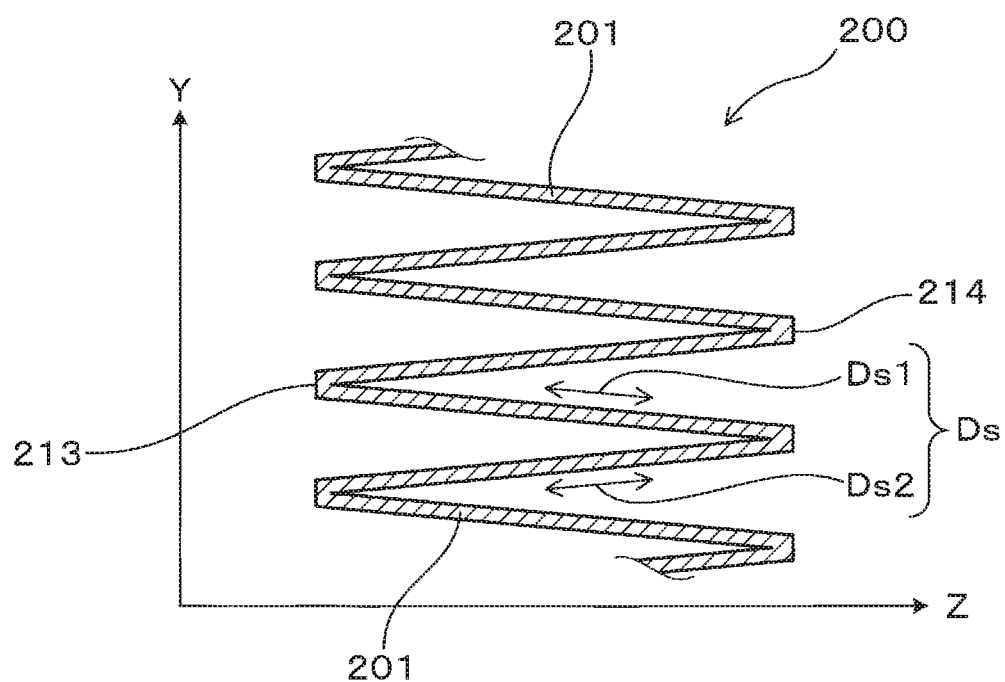
FIG. 13 is a YZ plane cross-sectional view of an inclined structure in the first embodiment.

The next step is extrusion molding of the inclined wall forming body to provide a bellows-shaped inclined structure 200 as illustrated in FIGS. 12 and 13. The direction of the extrusion is a direction orthogonal to the axial direction Z. Specifically, the YZ plane body of the inclined structure 200 illustrated in FIG. 13 is extruded in the X-axis direction. The YZ plane body may be referred to as a bellows section planar body, corrugated planar body, connection V-shaped planar body, etc. The X-axis direction is the direction orthogonal to the page of FIG. 13 and is the elongation direction of connecting parts 213, 214 of the inclined wall 211 formed after firing. As described above, extruding the YZ plane in the X-axis direction can provide the inclined structure 200 by extrusion molding. Mass productivity of the inclined structure 200 can be thus improved, resulting in better productivity of porous honeycomb filters.

As illustrated in FIGS. 12 and 13, the inclined structure 200 has many inclined parts 201 that form an inclined wall after the firing described later. A pair of adjacent inclined parts 201 are inclined approaching each other toward the connecting part 213 or the connecting part 214. A pair of adjacent inclined parts 201 have different inclination directions Ds1 and Ds2, respectively. In the present embodiment, the inclination direction of a pair of inclined parts 201 are symmetric to the axial direction Z, and the inclination angle is also symmetric. In the inclined structure 200, the inclined parts 201 are respectively connected at the ends in the axial direction Z to form the connecting parts 213, 214. The connecting parts 213, 214 extend along the X-axis direction, which is the extrusion direction.

Therefore, the adjacent two inclined parts 201 face each other, and the adjacent two inclined parts 201 are symmetrical to each other at a corresponding connecting part 213 or 214 with respect to the axial direction Z. As a result, as illustrated in FIG. 13, the YZ cross section of the inclined structure 200 has the shape of continuous V-shapes in which V-shapes are continuously aligned. The length of the inclined structure in the axial direction Z matches the axial length of the porous honeycomb filter unless the shrinkage after firing is taken into account.

The inclined structure 200 is then dried and shrunk by microwave drying. The inclined structure 200 is thereafter cut to a size larger than the diameter of a desired cylindrical filter 1, although it is not illustrated.

Next, a parallel wall forming material is integrally formed with the inclined structure 200. Thus a parallel part 202 is formed in the inclined structure 200 to obtain a honeycomb compact. Specifically, the parallel wall forming material is obtained by mixing powdered cordierite raw material and powdered photocurable resin. The amount of photocurable resin is preferably as low as possible if the parallel wall forming material can be cured by laser irradiation described later. The support wall can be thus made denser.

Figure 14A:
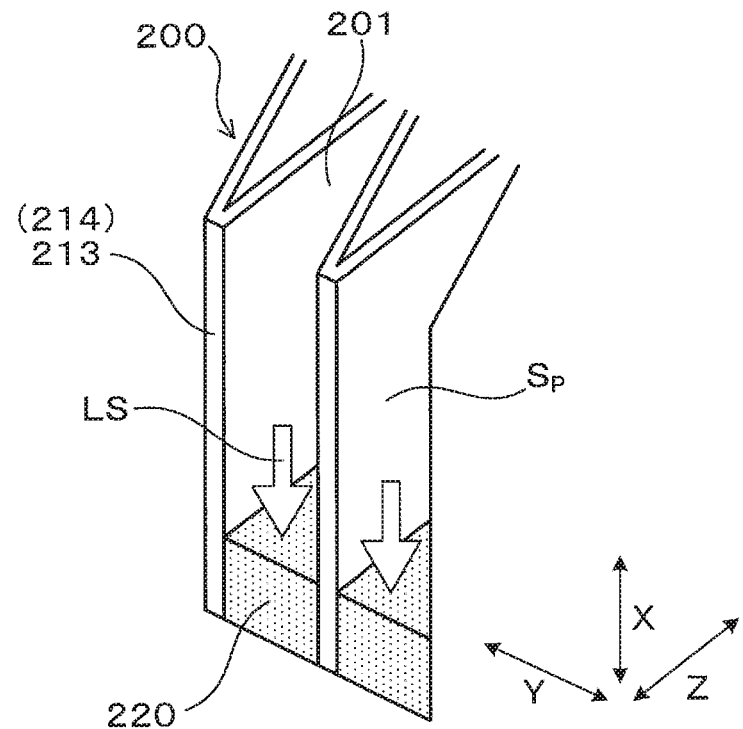
FIG. 14A is a partial perspective view of an inclined structure filled with parallel wall forming material in a space between inclined walls in the first embodiment.

Next, as illustrated in FIG. 14A, the inclined structure 200 is arranged so as to be extruded in the vertical direction. As described above, the inclined structure 200 is extruded in the X-axis direction, which is also the elongation direction of the connecting parts 213, 214. At this time, the Y-axis direction and Z-axis direction of the inclined structure 200 are horizontal.

Figure 14B:
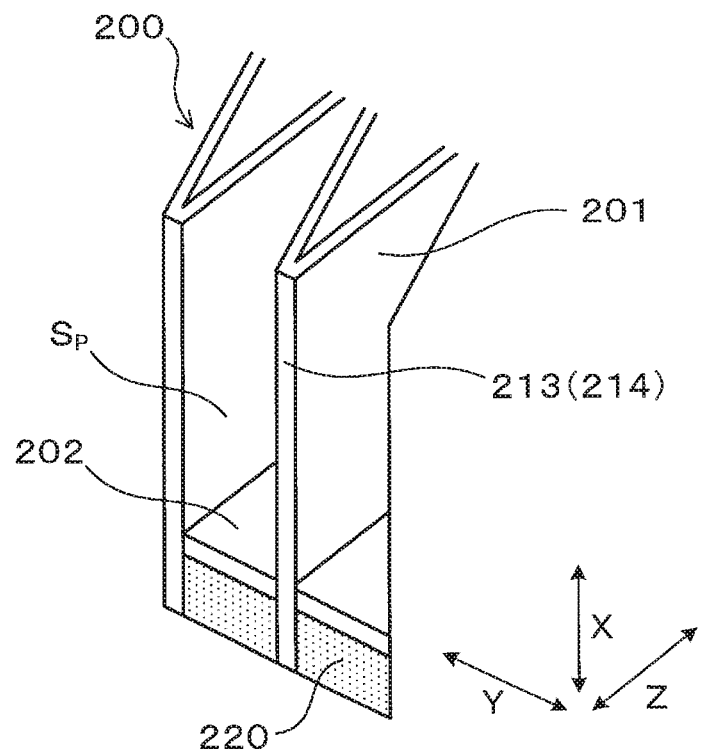
FIG. 14B is a partial perspective view of an inclined structure in which a parallel wall is formed by partially curing parallel wall forming material filled in a space between inclined walls in the first embodiment.

The next step is to fill space Sp between the inclined walls 211 of the inclined structure 200 with the parallel wall forming material 220 up to a predetermined height in the vertical direction. The next step is to irradiate the parallel wall forming material 220 inside space Sp with a laser beam LS, for example, in the vertical direction. The irradiation can be carried out, for example, in the vertical direction from top to bottom. As illustrated in FIG. 14B, this irradiation can cure the parallel wall forming material 220 from the irradiation surface to a predetermined thickness to form a parallel part 202. The curing thickness can be adjusted as appropriate according to a desired thickness of the support wall 221.

Figure 15:
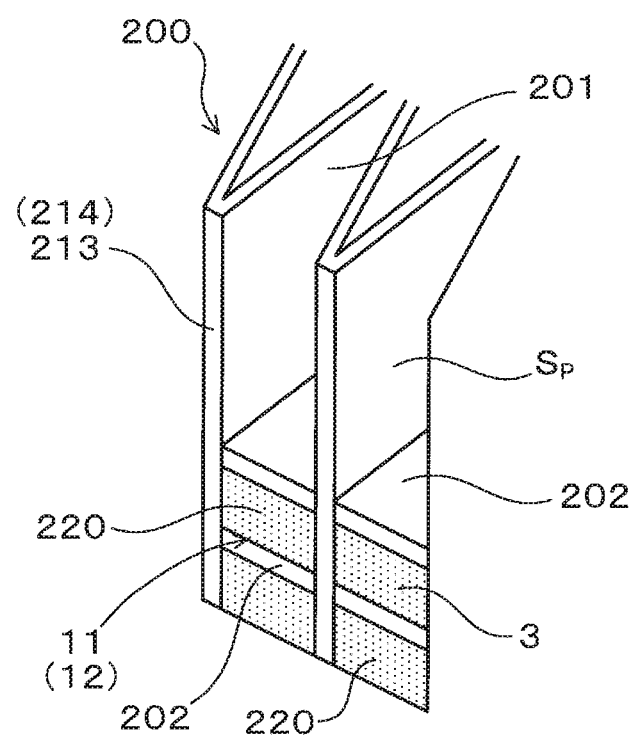
FIG. 15 is a partial perspective view of an inclined structure in which a plurality of parallel walls formed by curing parallel wall forming material are formed in the first embodiment.

The next step is, as illustrated in FIG. 15, to further fill a parallel wall forming material 220 onto the parallel part 202 up to a predetermined height in the vertical direction. Next, irradiating the parallel wall forming material 220 with a laser beam LS in the vertical direction to cure the parallel wall forming material 220 and further form the parallel part 202. By repetitively performing the filling of the parallel wall forming material 220 and the curing of the same by the irradiation with laser beam LS, the parallel parts 202 can be formed at a predetermined interval.

The next step is to discharge and remove uncured parallel wall forming material 220 remaining in the space Sp between the inclined walls 211 out of the space Sp. The uncured parallel wall forming material may be removed after the formation of all the parallel parts 202 or each parallel part 202. The parallel part 202 orthogonal to the inclined part 201 is thus integrally formed between each inclined part 201 in the inclined structure 200 to obtain a honeycomb compact. The parallel wall forming material 220, for example, can be easily removed from the opening of each cell 3 at the end surfaces 11, 12 by inclining the honeycomb compact. An air blower may be used in combination.

The parallel parts 202 can be formed with, for example, a 3D printer. A 3D printer allows the use of a parallel wall forming material 220 containing a photocurable resin, as in the present embodiment, or a parallel wall forming material 220 containing no photocurable resin. In this case, for example, a high energy laser having a short wavelength that can be absorbed by cordierite can be selected as a light source of the laser beam LS. Irradiation with the laser beam LS heats the cordierite raw material, which can be cured by at least partially sintering the same. An exemplary short wavelength laser beam is a femtosecond laser.

The next step is to form a tubular outer shell on the outer periphery by cementing after cylindrically hollowing out the honeycomb compact, though not shown in the figure. Thus a cylindrical honeycomb compact can be obtained. Firing this cylindrical honeycomb compact can provide the filter 1 illustrated in FIG. 1. As a result of the firing, the inclined part 201 becomes the inclined wall 211, and the parallel part 202 becomes the support wall 221.

A filter shape, cell shape, and the like can be changed as appropriate. A cell pitch, a cell wall thickness, an inclination angle of an inclined wall, a filter dimension such as a length and width can also be changed as appropriate.

The filter 1 of the present embodiment has a permeable cell wall 21 and an impermeable cell wall 22 as a cell wall 2, as illustrated in FIGS. 1 to 9. Permeable cell wall 21 permits exhaust gas G to permeate, thereby collecting PM from the exhaust gas G. The permeable cell wall 21 can be formed by inclining a cell wall relative to the axial direction Z, for example, as in the inclined wall 211. Adjusting the porosity of the permeable cell wall 21 as appropriate can raise the collection ratio and prevent pressure loss from increasing.

On the other hand, the impermeable cell wall 22 is not required to allow permeation of the exhaust gas G, and has a smaller porosity than the permeable cell wall 21. Even if the number of the impermeable cell walls 22 is reduced relative to the permeable cell walls 21, therefore, the less porous impermeable cell walls 22 can still strengthen the filter to a sufficient degree for practical use. The impermeable cell wall 22 is formed by a support wall 221 that is smaller in porosity and dense than the inclined wall and extends in parallel to, for example, the axial direction Z.

In the filter 1, the permeable cell walls 21 and impermeable cell walls 22 can be thus provided with different functions, respectively. The permeable cell wall 21 can collect PM while controlling the increase in pressure loss, and the impermeable cell wall 22 can be strong enough for practical use.

The filter 1 can be subject to various modifications within a range that does not impair the effect. For example, in the filter 1 of the present embodiment, a pair of inclined walls 211 forming each cell 3 are symmetric to the axial direction Z going through the connecting parts 213, 214, but may also be asymmetric. The inclined walls 211 may have a constant inclination angle relative to the axial direction Z, being alternately changing a direction of inclination as in the present embodiment, but may also have an inconstant inclination angle.

In the filter 1 of the present embodiment, the opposing inclined walls 211 are connected at either one of the both end surfaces 11, 12, but the inclined walls 211 may not be connected on the end surfaces 11, 12, and the cells 3 may be open at the end surfaces 11, 12. Even in this case, each cell 3 has an inclined wall 211, the opening area of the cell of the inflow end surface 11 of the reduction cell 32 is larger than that of the outflow end surface 12, while the opening area of a cell of the inflow end surface 11 of the enlargement cell is smaller than that of the outflow end surface 12. For a higher collection ratio, it is preferable that the opposing inclined walls 211 are connected directly at any point in the axial direction, or coupled by a coupling constituent member as mentioned below, and cells 32, 33 are each closed.

The inclined structure 200 used to manufacture the filter 1 is preferably produced by extrusion molding as in the present embodiment in terms of productivity, but it may be produced by, for example, injection molding, a 3D printer, etc. It is also possible to produce the whole compact with a 3D printer and the like.

Modified Example 1

The present example is provided to describe a modified example of the manufacturing method. The first embodiment describes an example of forming a support wall by filling parallel wall forming material and laser irradiation after manufacturing an inclined structure. In the present example, a support wall is formed by using a green sheet. Out of the reference symbols used in the present example and afterwards, those identical to the reference symbols used in in the foregoing embodiments refer to the same components as those in the foregoing embodiments, unless otherwise indicated.

Figure 16A:
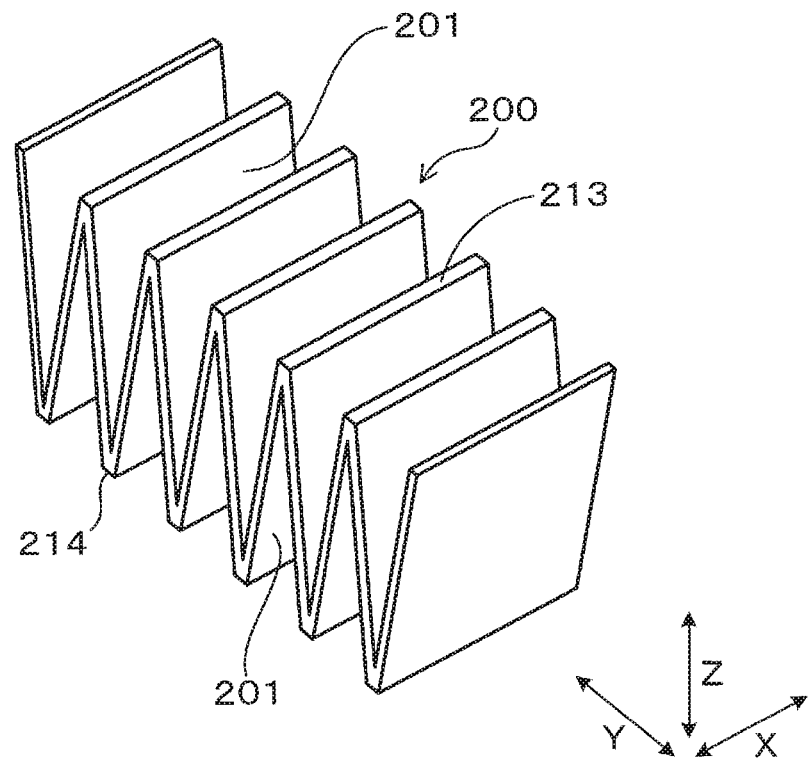
FIG. 16A is a perspective view of an inclined structure in the Modified Example 1.
Figure 16B:
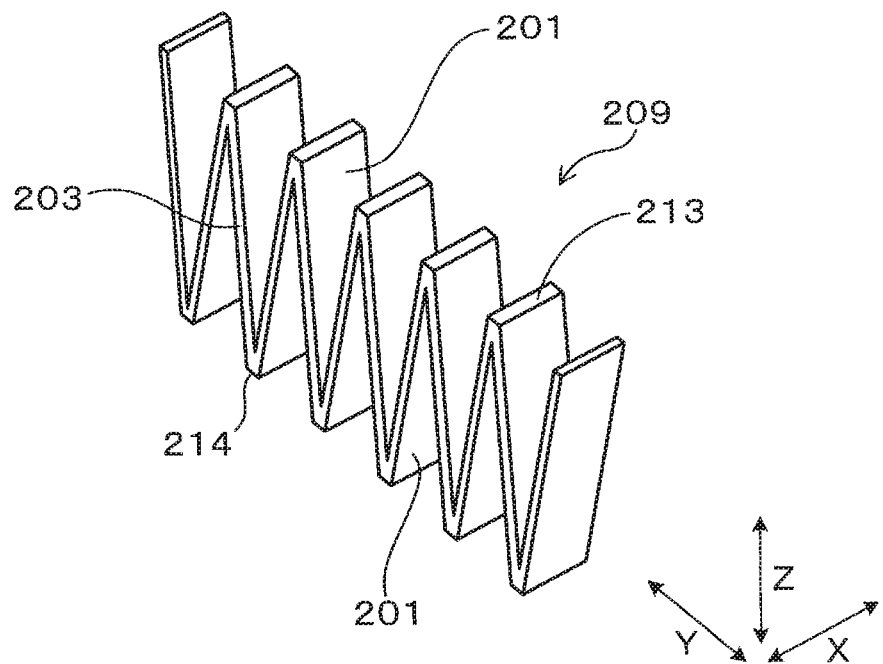
FIG. 16B is a perspective view of an inclined structure piece in the Modified Example 1.

As illustrated in FIG. 16A, an inclined structure 200 is first formed as in the first embodiment. The inclined structure 200 is then cut in a cross section orthogonal to the X-axis, i.e., in the YZ cross section. The cutting may be carried out, for example, at the same width as the pitch at which a desired support wall 221 is formed. A plurality of inclined structure pieces 209 illustrated in FIG. 16B are thus cut out. The inclined structure piece 209 are each identically shaped to the inclined structure 200 except that the width in the X-axis direction is small.

Then slurry parallel wall forming material is produced by mixing cordierite raw material, an organic solvent, and a butyral binder. The parallel wall forming material is formed into a sheet of a predetermined thickness by a doctor blade method to obtain an unfired sheet-like compact. The sheet-like compact is hereinafter referred to as a green sheet. The thickness of the green sheet can be adjusted as appropriate so that a support wall 221 of a desired thickness is formed after the green sheet is fired.

Figure 17A:
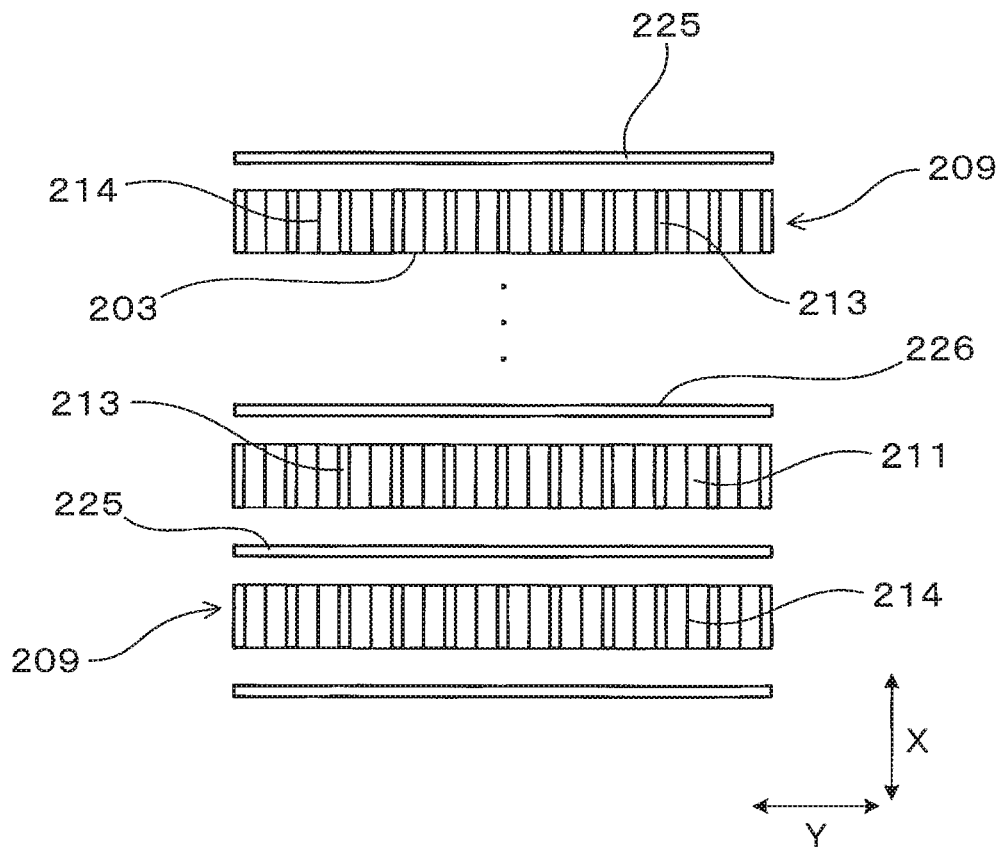
FIG. 17A is an explanatory drawing of a process of laminating an inclined structure piece and a green sheet for forming a parallel part in Modified Example 1.

A cut surface 203 of the inclined structure piece 209 and a sheet surface 226 of a green sheet 225 are then laminated alternately, as illustrated in FIGS. 16B and 17A, so as to contact with each other. The cut surface 203 of the inclined structure piece 209 corresponds to the YZ plane in FIG. 16B and is shaped like bellows. The green sheet 225 corresponds to the parallel part 202 in the first embodiment, and becomes a support wall 221 after firing.

For example, an organic solvent is preferably applied onto the contacting surface between the inclined structure piece 209 and the green sheet 225 at a time of lamination. This provides better adhesion between the inclined structure piece 209 and the green sheet 225, which can prevent the occurrence of cracks and/or partial cell wall deformation when or after firing.

In terms of improvement in adhesiveness, it is preferable to use an organic solvent that is the same as or similar to those used in the production of the green sheet 225. The organic solvent can be applied, for example, by spraying. In addition, the organic solvent can be applied onto the cut surface 203 of the inclined structure piece 209. Further, the inclined structure piece 209 and the green sheet 225 may be bonded by thermal compression bonding. This can also prevent the occurrence of cracks and/or deformation.

Figure 17B:
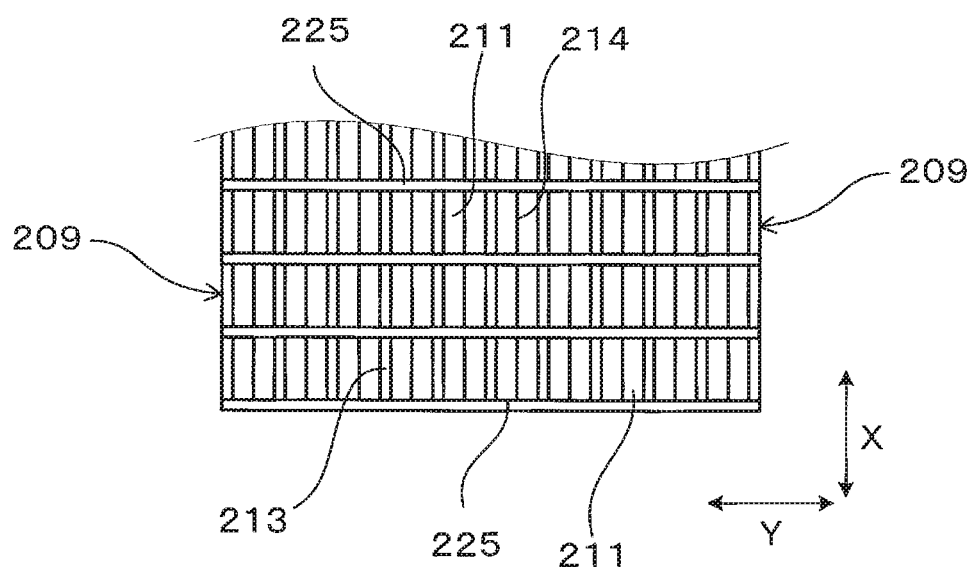
FIG. 17B is a partial enlarged view of the XY plane of a honeycomb compact made up of a laminate of inclined structure pieces and green sheets in Modified Example 1.

In this manner, many inclined structure pieces 209 and many green sheets 225 are alternately laminated. Thereby, as illustrated in FIG. 17B, it is possible to obtain a honeycomb compact including a laminate of the inclined structure pieces 209 and the green sheets 225. Then carrying out the same operation as in the first embodiment can provide a filter 1 that is similar to that of the first embodiment.

The Second Embodiment

Figure 18:
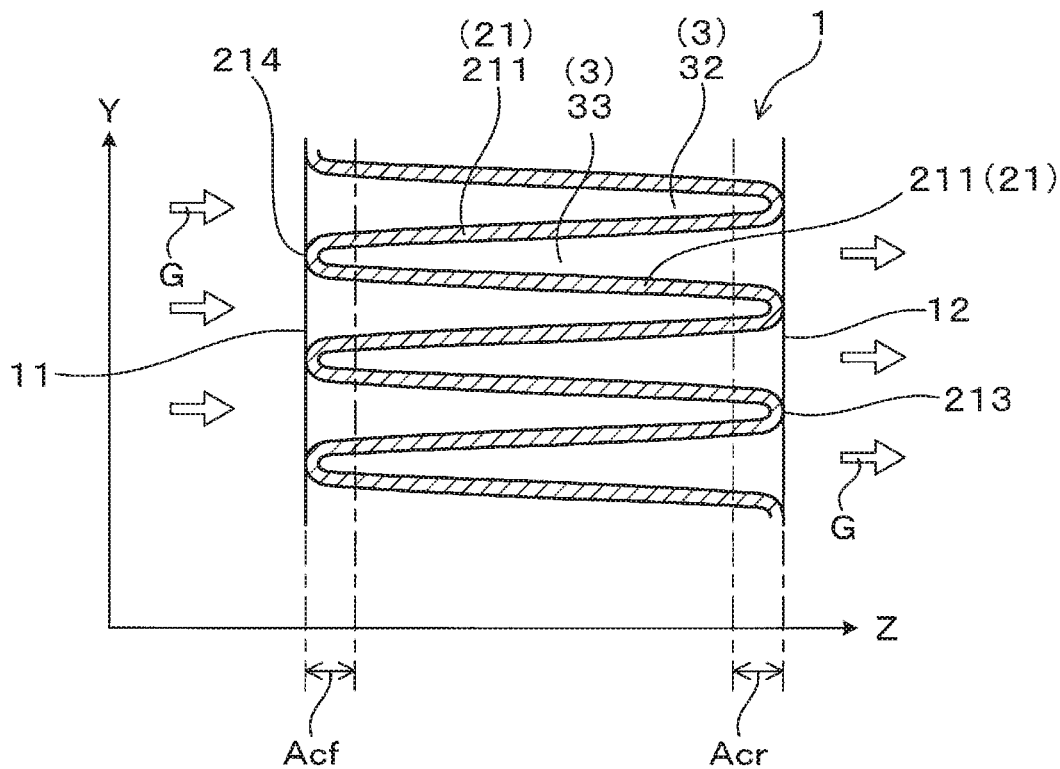
FIG. 18 is a YZ plane cross-sectional view of a porous honeycomb filter of a second embodiment.
Figure 19:
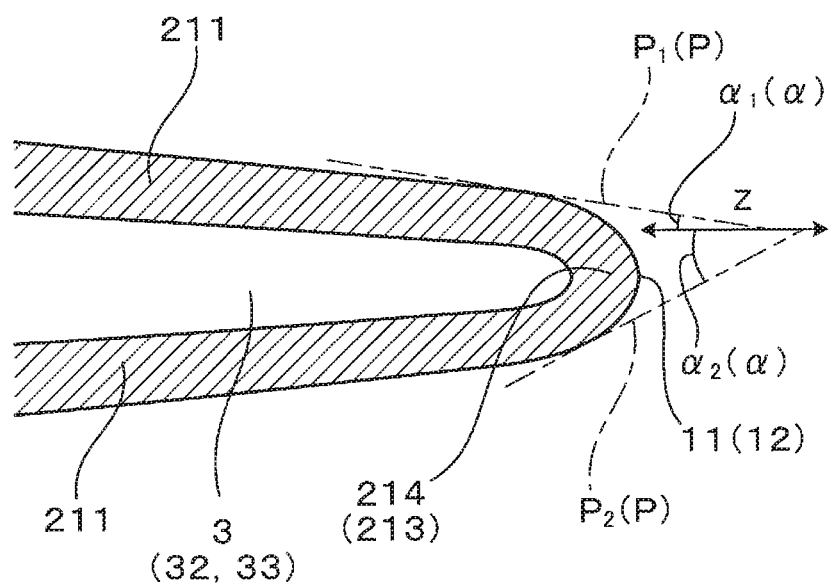
FIG. 19 is a partial cross-sectional enlarged view of a connecting part of a curved inclined wall in the second embodiment.

Now a description will be given of an embodiment of a porous honeycomb filter in which inclined walls are curvilinearly inclined at both axial ends thereof. As illustrated in FIGS. 18 and 19, the filter 1 of the present embodiment has an inclined wall 211 that serves as a permeable cell wall 21 curved toward the inflow end surface 11 or the outflow end surface 12 of the axial direction Z, respectively.

Similar to the filter of the first embodiment, the filter 1 of the present embodiment has a cell 3 whose XY cross section has a quadrilateral outer edge. A pair of opposing cell walls 2 are formed by inclined walls 211 and the remaining pair of opposing cell walls 2 are formed by support walls 221 (see FIG. 1). As illustrated in FIG. 18, the opposing two inclined walls 211 are linearly inclined at a central portion of the axial direction Z, but, as illustrated in FIGS. 18 and 19, are curvilinearly inclined toward the inflow end surface 11 and the outflow end surface 12.

More specifically, an inclined wall 211 extending in the axial direction Z has an inflow-side curvilinearly inclined area Acf curvilinearly inclined toward the inflow end surface 11 and an outflow-side curvilinearly inclined area Acr inclined toward the outflow end surface 12. In a reduction cell 32, a pair of inclined walls 211 are connected to each other in the outflow-side curvilinearly inclined area Acr to form an outflow-side connecting part 213. On the other hand, in enlargement cell 33, a pair of inclined walls 211 are connected to each other in the inflow-side curvilinearly inclined area Acf to form an inflow-side connecting part 214. As a result, the inflow-side connecting part 214 and outflow-side connecting part 213 assume a curved structure. The inclined walls 211 between inflow-side curvilinearly inclined area Acf and outflow-side curvilinearly inclined area Acr are linearly inclined.

As described above, the inclined walls 211 are each curved toward each of the end surfaces 11, 12, an angle α between a tangential plane P of the inclined wall 211 and the axial direction Z increases toward each of the end surfaces 11, 12 in the axial direction. Specifically, as illustrated in FIG. 18, an angle $\alpha_2$ between a tangential plane $P_2$ at a first point of the inclined wall 211 and the axial direction Z, and an angle $\alpha_1$ between a tangential plane $P_1$ at a second point of the inclined wall 211 and the axial direction Z satisfy the relationship $\alpha_1 < \alpha_2$; the second point is closer to the end surface 11 or 12 than the first point is.

As in the present embodiment, the inclined wall 211 may have a curved surface. If the inclined wall 211 is curvilinearly inclined and curved in the YZ cross section as illustrated in FIGS. 18 and 19, the flow rate of the exhaust gas flowing through the inclined wall 211 can be less varied. As shown in the experimental example described below, the variation is smaller than the filter 1 of the first embodiment and the filter 1 of the third embodiment, the latter being described later. This can provide an excellent collection ratio while sufficiently reducing pressure loss.

As illustrated in FIG. 18, the inclination direction of a pair of curvilinearly inclined walls 211 are symmetrical to the axial direction Z and are connected to each other on the inflow end surface 11. As a result, in the inflow-side curvilinearly inclined area Acf, the gas flow passage cross-sectional area of each cell 3 increases toward the inflow end surface 11, and the amount of the increase also increases toward the inflow end surface 11. The same applies to the outflow-side curvilinearly inclined area Acr. Each cell 3 therefore has a larger opening area on the inflow end surface 11 and outflow end surface 12, thereby further reducing the pressure loss. Note that the direction in which the curvilinearly inclined walls are inclined refers to a tangential direction. Therefore, if the inclination direction is symmetrical to the axial direction, this means that each tangent on the curvilinearly inclined wall is symmetrical. However, strictly all the tangents may not be symmetrical, it is only required to be substantially symmetrical in appearance.

FIG. 18 shows an example of an inclined wall that is inclined linearly between the inflow-side curvilinearly inclined area Acf and the outflow-side curvilinearly inclined area Acr, but the inclined linearly area is not necessarily required. Although not illustrated, providing, for example, an inflection point at the axial center of the inclined wall in the YZ cross section of the filter also makes it possible to form an inclined wall in which the inflow-side curvilinearly inclined area Acf and outflow-side curvilinearly inclined area Acr whose inclination direction are mutually symmetrical to the axial direction are connected at the inflection point. Other configurations and operational effects are the same as those of the first embodiment.

The Third Embodiment

Figure 20:
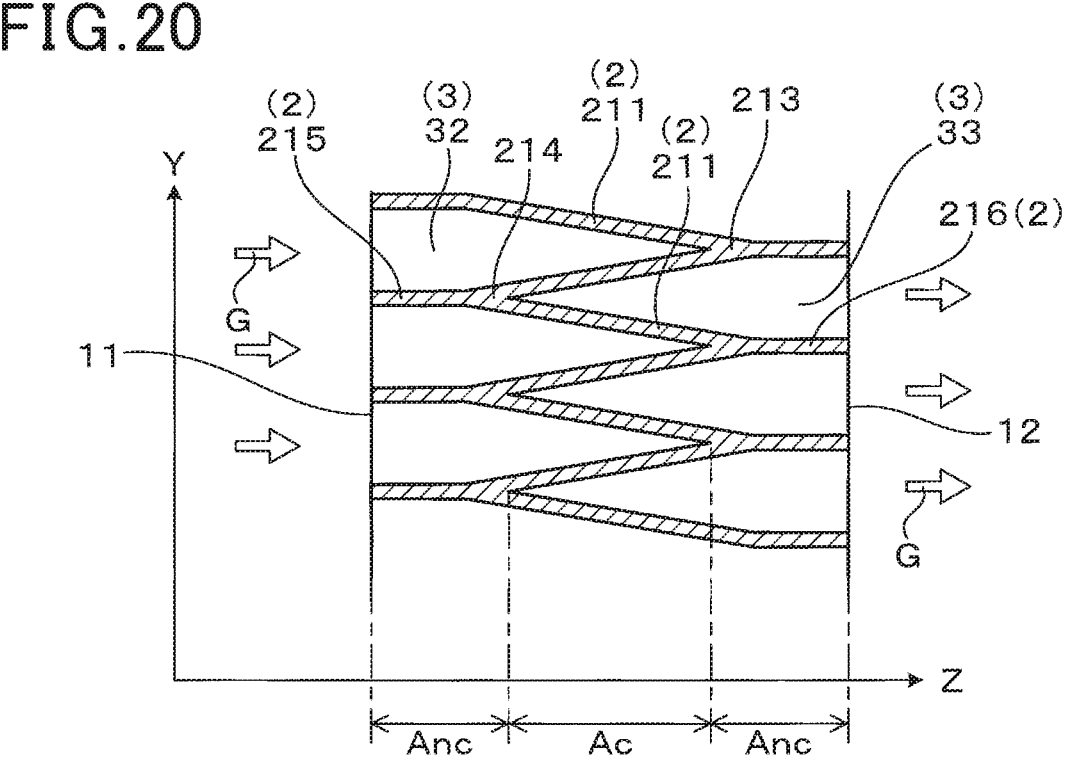
FIG. 20 shows the YZ plane cross-sectional view of a porous honeycomb filter of a third embodiment.

Now a description will be given of an embodiment of a porous honeycomb filter in which the inclined walls are connected and closed more inner in the axial direction than the inflow end surface and outflow end surface. In the embodiment described above, the inclined walls 211 that serve as the permeable cell wall 21 are connected at the both end surfaces 11, 12 of the axial direction Z to close the cell 3. In the present embodiment, however, a description will be given of a filter 1 in which a pair of opposing inclined walls 211 are connected more inner than the both end surfaces 11, 12 to close a cell 3, as illustrated in FIG. 20.

Similar to the filter of the first embodiment, the filter 1 of the present embodiment has a cell 3 whose XY cross section has a quadrilateral outer edge. A pair of opposing cell walls 2 each have an inclined wall 211 inclined relative to the axial direction Z, and the remaining pair of cell walls 2 are formed by support walls 221 extending parallel to the axial direction Z (see FIG. 1). As illustrated in FIG. 20, a pair of inclined walls 211 extending in the axial direction Z are connected to each other more inner in the axial direction Z than the inflow end surface 11 or outflow end surface 12 to form connecting parts 213, 214.

The filter 1 of the present embodiment illustrated in FIG. 20 will be described with a focus on a series of cell wall 2 that includes an inclined wall 211 and extends to the both end surfaces 11, 12 of the axial direction Z. The cell wall 2 has an inclined wall 211 formed between the inflow-side connecting part 214 and outflow-side connecting part 214 at the center of the axial direction Z. The series of cell wall 2 described above additionally has an inflow-side parallel wall 215 that continues to the inflow side of inclined wall 211 and extends parallel to the axial direction Z and an outflow-side parallel wall 216 that continues to the outflow side of inclined wall 211 and extends parallel to the axial direction Z. The inclined wall 211, the inflow-side parallel wall 215, and the outflow-side parallel wall 216 may be formed by a constituent member having a different composition and/or porosity. To produce an inclined structure with good productivity by extrusion molding as in the first embodiment or Modified Example 1, the inclined wall 211, the inflow-side parallel wall 215, and the outflow-side parallel wall 216 are each preferably comprised of an identical constituent member.

Now the filter 1 of the present embodiment will be described in terms of a cell wall surrounding a reduction cell 32 and an enlargement cell 33. A reduction cell 32 into which the exhaust gas G flows from the inflow end surface 11 has a pair of opposing inclined walls 211 and a pair of inflow-side parallel walls 215 respectively connected to the inflow side of each inclined wall 211 and extending parallel to the axial direction Z. The pair of inclined walls 211 in the reduction cell 32 are inclined toward the outflow end surface 12 such they may be close to each other, and are connected to each other more inner in the axial direction Z than the outflow end face 12. As illustrated in FIG. 20, a pair of inclined walls 211 are, for example, directly connected to each other, thereby forming the outflow-side connecting part 213, and close the reduction cell 32. The outflow-side connecting part 213 may be formed, for example, closer in the axial direction Z to the outflow end surface 12. Parts of the inclined walls 211, which are closer to the outflow end surface 12 than the outflow-side connecting part 213 is, are joined to each other to form an outflow-side parallel wall, i.e. a cell wall 216 that extends parallel to the axial direction.

An enlargement cell 33 into which the exhaust gas G is discharged from the outflow end surface 12 has a pair of opposing inclined walls 211 and a pair of outflow-side parallel wall 216 connected to the outflow side of each inclined wall 211 and extending parallel to the axial direction Z. The pair of inclined walls 211 in the enlargement cell 33 are inclined toward the inflow end surface 11 such they may be close to each other, and are connected to each other more inner in the axial direction Z than the inflow end face 11. As illustrated in FIG. 20, a pair of inclined walls 211 are, for example, directly connected to each other, thereby forming the inflow-side connecting part 214, and close the enlargement cell 33. The inflow-side connecting part 214 may be formed, for example, closer in the axial direction Z to the inflow end surface 11. Parts of the inclined walls 211, which are closer to the outflow end surface 11 than the outflow-side connecting part 214 is, are joined to each other to form an outflow-side parallel wall, i.e. a cell wall, 215 that extends parallel to the axial direction.

In the reduction cell 32 and the enlargement cell 33, the pair of opposing inclined walls 211 can be inclined, for example, symmetrically relative to the axial direction Z. The reduction cell 32 and the enlargement cell 33 are adjacent to each other with common inclined walls 211, and are formed, for example, alternately in the Y-axis direction.

As illustrated in FIG. 20, the filter 1 has, for example, a communication area Ac in which a reduction cell 32 and an enlargement cell 33 are adjacent to each other in the Y-axis direction via an inclined wall 211, and a non-communication area Anc in which these cells are not adjacent to each other. The communication area Ac is an area where the exhaust gas G passes through the inclined wall 211, the exhaust gas G flowing into the reduction cell 32 passes through the inclined wall 211 in the communication area Ac to be discharged from the enlargement cell 33. In the non-communication area Anc, on the other hand, reduction cells 32 are adjacent to each other via an inflow-side parallel wall 215, and enlargement cells 33 are adjacent to each other via an outflow-side parallel wall 216. The exhaust gas G practically fails to pass through cell walls, such as the parallel walls 215, 216, in the non-communication area Anc. The communication area Ac is formed at a central area in the axial direction Z, while the non-communication areas Anc are each formed in a predetermined area in the axial direction Z from the both end surfaces 11, 12.

Inflow-side parallel wall 215 and outflow-side parallel wall 216 can be, for example, of an equal length. The non-communication area Anc on the inflow end surface 11 side and the non-communication area Anc on the outflow end surface 12 side can also be of an equal length. The lengths of the inflow-side parallel wall 215 and the outflow-side parallel wall 216 may be changed as appropriate and be the same or different.

In the case in which the cell walls 2 are formed at an equal pitch in a filter 1 of the same shape and size, forming the connecting parts 213, 214 respectively more inner in the axial direction Z than the outflow end surface 12 and the inflow end surface 11 (see FIG. 23), as in the present example, can provide an approach zone in which no gas permeates through the cell walls 2 on inflow end surface 11 and outflow end surface 12, unlike the case in which the connecting parts 213, 214 of the inclined wall 211 are respectively formed on the outflow end surface 12 and the inflow end surface 11 as in the first embodiment (see FIG. 2). The approach zone suppresses inflow loss or gas concentration to the cells 3, which can be attributed to an impact of gas turbulence caused by the collision of the exhaust gas G against a cell wall 2 on the inflow end surface 11. This can reduce the pressure loss.

As shown in the experimental example described below, connecting the linearly extending inclined walls 211 to each other more inner than the both end surfaces 11, 12, as in the present embodiment, can reduce flow rate variation of the exhaust gas G passing through the inclined walls 211, the variation is minor than in the case in which they are connected at the both end surfaces 11, 12, as in the first embodiment. This can provide an excellent collection ratio while reducing pressure loss.

The Fourth Embodiment

Figure 21:
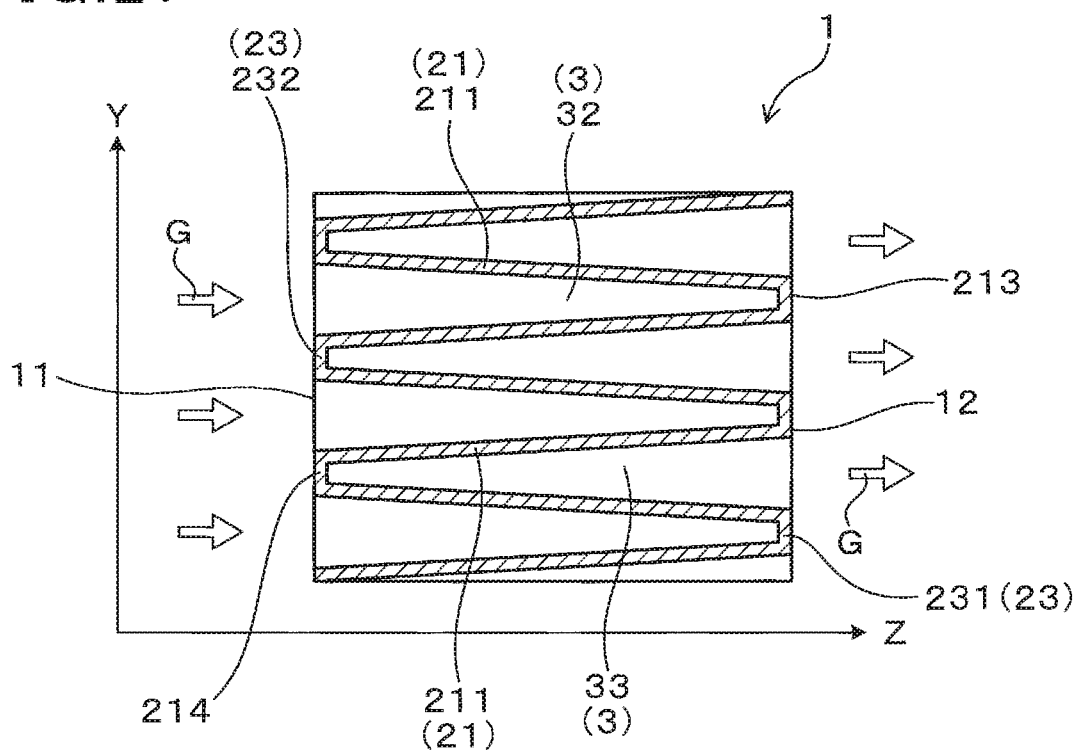
FIG. 21 shows the YZ plane cross-sectional view of a porous honeycomb filter of a fourth embodiment.
Figure 22:
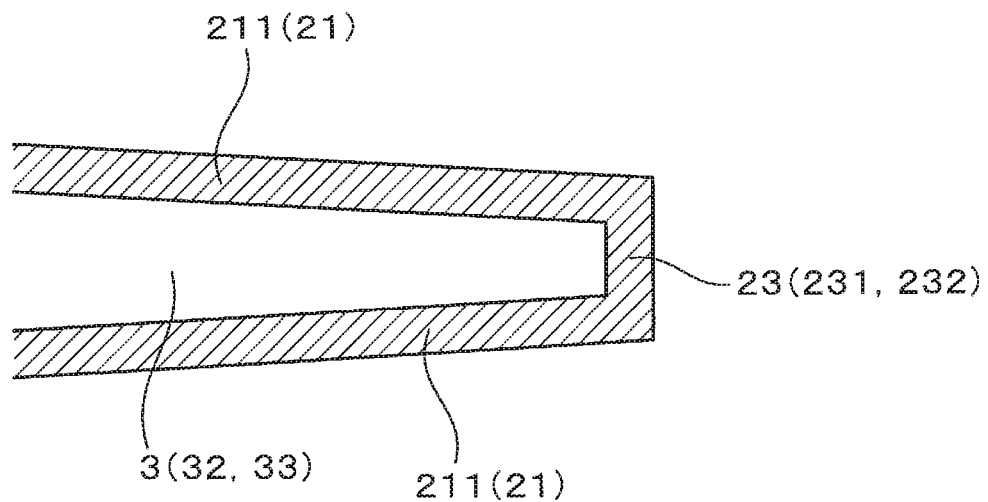
FIG. 22 is a partial cross-sectional enlarged view of the connecting part of an inclined wall of the fourth embodiment.

A description will be given of an embodiment of a porous honeycomb filter in which inclined walls are connected by a connecting member. In the embodiment described above, a pair of opposing inclined walls 211 extending in the axial direction Z are directly connected at the connecting parts 213, 214. In the present embodiment, as illustrated in FIGS. 21 and 22, the filter 1 in which the inclined wall 211 is connected via the connecting member 23 which is parallel to end surfaces 11, 12 will be described.

The filter 1 of the present embodiment has a cell 3 with outer edge shape of XY cross section in the form of a quadrilateral, the same way as the first embodiment. A pair of opposing cell walls 2 are formed by inclined walls 211 inclined relative to the axial direction Z, and the remaining pairs of cell walls 2 are formed by support walls 221 extending parallel to the axial direction Z (see FIG. 1). As illustrated in FIGS. 21 and 22, a pair of inclined walls 211 extending in the axial direction Z are not connected directly but via a connecting member 23.

A reduction cell 32 is closed by an outflow-side connecting member 231 provided on an outflow end surface 12, and the outflow-side connecting member 231 forms an outflow-side connecting part 213. On the other hand, a enlargement cell 33 is closed by an inflow-side connecting member 232 provided on an inflow end surface 11, and the inflow-side connecting member 232 forms an inflow-side connecting part 214.

Each inclined wall 211 is continuously and linearly inclined from the inflow end surface 11 toward the outflow end surface 12. In the case in which the inclined walls 211 at an equal cell pitch in the filter 1 is of the same shape and size, connecting the inclined walls 211 to each other via the connecting member 23 at the both end surfaces 11, 12 as in the present embodiment makes the inclination angle of the inclined walls 211 smaller than connecting the inclined walls 211 to each other intersectionally at the both end surfaces 11, 12 as in the first embodiment (see FIG. 2).

The connecting member 23 has, for example, a surface orthogonal to the axial direction Z. The connecting member can be provided parallel to the inflow end surfaces 11, 12 as described above, but may be inclined as long as the connecting member can connect a pair of inclined walls 211. The material of the connecting member 23 can be selected as appropriate. There is no particular limitation, but the connecting member 23 can be formed of, for example, cordierite, like a cell wall 2, such as an inclined wall 211 and a support wall 221. The connecting member 23 closes a gas flow passage within the cell 3 in appearance. The connecting member 23 itself may or may not allow gas permeation.

The connecting member 23 is preferably made of the same constituent member as the inclined wall 211. In this case, an inclined structure 200 in which a large number of inclined walls 211 are connected by the connecting member 23 can be manufactured by extrusion molding, as in the first embodiment and Modified Example 1. In other words, as an inclined structure 200, the inclined wall 211 and the connecting member 23 can form an integrated structure, which enables extrusion molding, thereby productively manufacturing the filter 1.

Connecting the inclined walls 211 extending linearly and inclined relative to the axial direction Z with connecting member 23 at the both end surfaces 11, 12, as in the present embodiment, still allows the inclined walls 211 to form a permeable cell wall 21. The inclination angle can be reduced as described above, which in turn increases the distance along which the exhaust gas G passes through in the inclined wall 211. This makes it possible to improve the PM collection ratio. This configuration increases an internal pressure difference of the inclined wall 211, which facilitates exhaust gas permeation through the permeable cell wall 21.

Further, adjusting the porosity of the connecting member 23 makes it possible to collect PM from the exhaust gas G in the connecting member 23 of the end surfaces 11, 12 as well. Because of the presence of the inclined walls 211, the area in which the connecting member 23 is formed at end surfaces 11, 12 of each cell 3 is smaller than the area in which the connecting member 23 is formed in a filter having a cell wall that has no inclined wall 211 and extends parallel to the axial direction Z, as shown in Comparative Embodiment 1, which will be described later. This also makes it possible to reduce pressure loss. The area in which the connecting member 23 is formed is an area of the connecting member 23 at the end surfaces 11, 12 of the filter 1. Other configurations and operational effects are the same as those of the first embodiment.

The Fifth Embodiment

Figure 23:
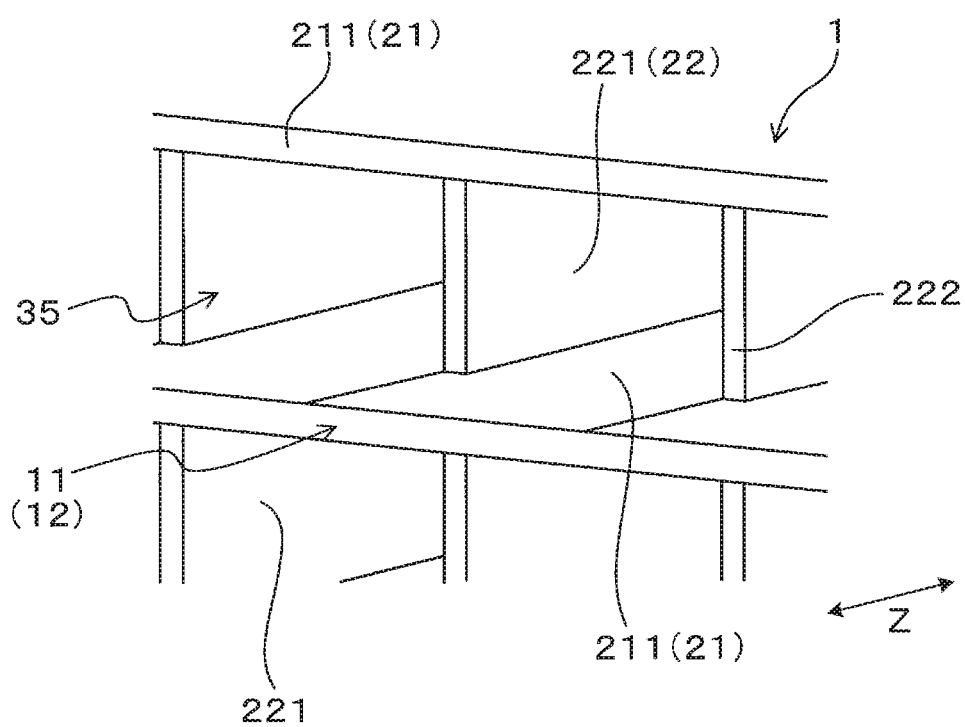
FIG. 23 is an enlarged view of an end surface of a porous honeycomb filter of a fifth embodiment.

A description will now be given of an embodiment of a porous honeycomb filter in which an axial end of an impermeable cell wall is formed inner than an axial end surface. In the embodiments described above, the impermeable cell walls 22 each included a support wall 221 reaches the both end surfaces 11, 12 in the axial direction Z. In the present embodiment, as illustrated in FIG. 23, FIG. 24A and FIG. 24B, the impermeable cell wall 22 does not reach either the end surface 11 or the end surface 12 in the axial direction Z, and an end 222 of the impermeable cell wall 22 is present more inner in the axial direction Z than the end surfaces 11, 12.

Similar to the filter of the first embodiment, the filter 1 of the present embodiment has a cell 3 whose XY cross section has a quadrilateral outer edge. A pair of opposing cell walls 2 are formed by inclined walls 211 extending inclined relative to the axial direction Z. The inclined walls 211 each serve as a permeable cell wall 21. A pair of inclined walls 211 reach the inflow end surface 11 or the outflow end surface 12.

On the other hand, the remaining two opposing cell walls 2 are formed by support walls 221 extending parallel to the axial direction Z. These support walls 221 each serve as an impermeable cell wall 22. As illustrated in FIG. 23, FIG. 24A FIG. 24B, the pair of impermeable cell walls 22 fail to reach the inflow end surface 11 or the outflow end surface 12, and an end 222 of each impermeable cell wall 22 is present more inner in the axial direction Z than the respective end surface 11, 12.

Figure 24A:
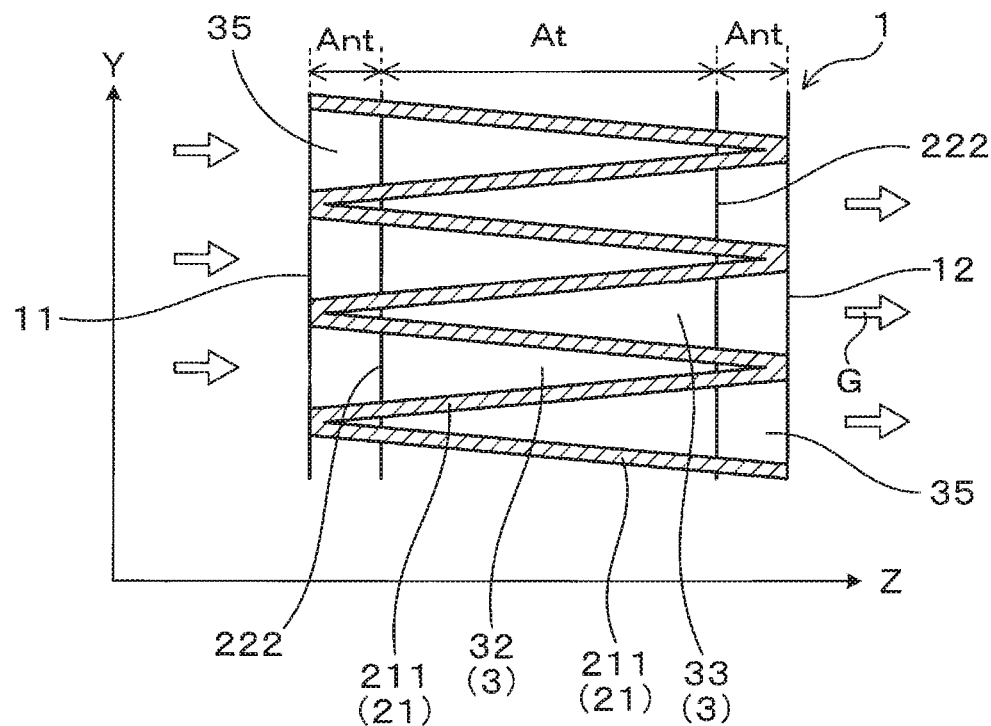
FIG. 24A is a YZ plane cross-sectional view of a porous honeycomb filter of the fifth embodiment.
Figure 24B:
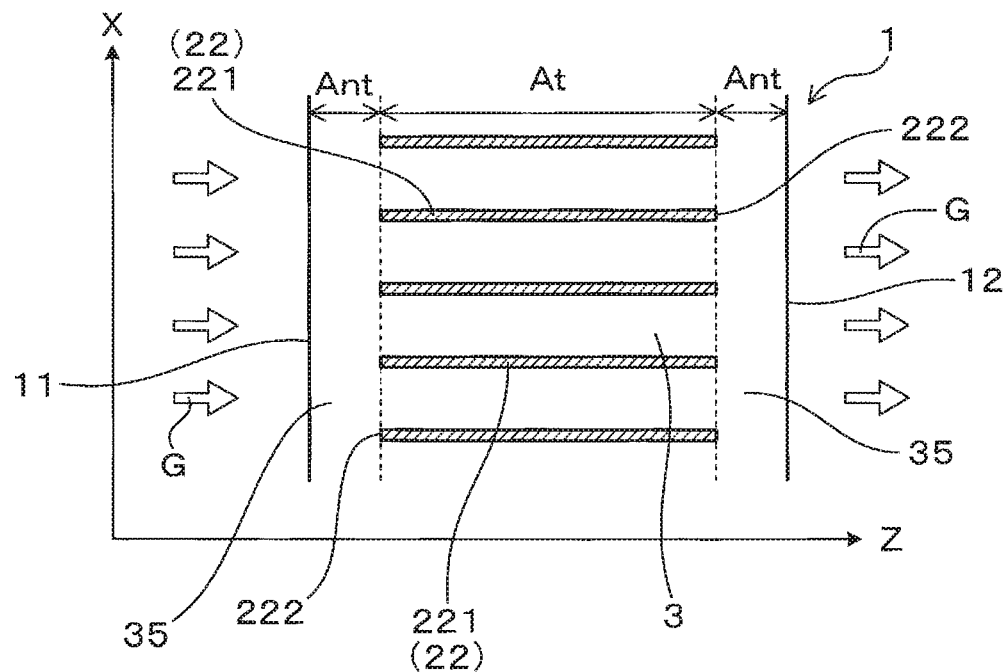
FIG. 24B is an XZ plane cross-sectional view of a porous honeycomb filter of the fifth embodiment.

As illustrated in FIG. 24A and FIG. 24B, the impermeable cell walls 22 are formed at a predetermined area At inside the filter 1 along the axial direction Z. An forming area At for the impermeable cell walls 22 is present more inner than the both end surfaces 11, 12. An non-forming area Ant for impermeable cell walls 22 is formed in a predetermined area from the both end surfaces 11, 12 inside the filter 1. No impermeable cell wall is formed in the non-forming area Ant.

As a result, each cell 3 is surrounded by a pair of permeable cell walls 21 and a pair of impermeable cell walls 22 in the forming area At described above, while each cell 3 is sandwiched by a pair of permeable cell walls 21 without being sandwiched by a pair of impermeable cell walls 22 in the non-forming area Ant. An enlargement cell opening 35 is formed on the both end surfaces 11, 12 of the filter 1, and the enlargement cell opening 35 is sandwiched by a pair of permeable cell wall 21 and there is no impermeable cell 22 in the enlargement cell opening 35.

If the end surfaces 11, 12 of the filter 1 have an enlargement cell opening 35 as described above, pressure loss can be further reduced. If the enlargement cell opening 35 is formed on the inflow end surface 11, in particular, the opening area of the inflow end surface 11 into which exhaust gas flows becomes larger, which makes a more prominent effect of reducing the pressure loss.

The Length in the axial direction Z of the forming area At and the non-forming area Ant for impermeable cell walls 22 can be changed as appropriate. The impermeable cell walls 22 including support walls 221 can improve filter strength, as described above. To sufficiently improve the filter strength, the length in the axial direction Z of the forming area At for the impermeable cell walls 22 is preferably 80% or more of the total length in the axial direction Z of the filter, more preferably 90% or more, and even more preferably 95% or more.

To fully provide the effect of reducing the pressure loss with the enlargement cell opening 35, the length in the axial direction Z of the area non-forming $A_{nt}$ for the impermeable cell walls 22 is preferably 1% or more of the total length in the axial direction Z of the filter, more preferably 3% or more, and more preferably 5% or more. If the non-forming area Ant is formed at both ends in the axial direction Z, the length in the axial direction Z of the area non-forming $A_{NT}$ refers to a length of the respective areas $A_{NT}$.

The non-forming area $A_{nt}$ for impermeable cell wall 22 and the enlargement cell opening 35 formed due to this may be formed on the both end surfaces 11, 12 of the axial direction Z, but may also be formed on one end surface. In terms of the further reducibility in pressure loss on the inflow end surface 11 as described above, the non-forming area Ant for impermeable cell wall 22 and the enlargement cell opening 35 are preferably formed at least on the inflow end surface 11. Other configurations and operational effects are the same as those in the first embodiment.

The Sixth Embodiment

A description will now be given of a filter having a smaller cross-sectional area occupied by impermeable cell walls than a cross-sectional area occupied by permeable cell walls in a cross section of the filter in the direction orthogonal to the axial direction. First, a description will be given with reference to FIGS. 4 to 8.

As illustrated in FIGS. 4 to 8, the area $S_a$ of a region formed of a cross section of a permeable cell wall 21, and the area $S_b$ of an area formed of a cross section of an impermeable cell wall 22 are present in a cross section orthogonal to the axial direction of the filter 1. For example, in each cross section shown in FIGS. 5 to 7, a cross section of a permeable cell wall 21 is a fine oblique line hatched region that extends parallel to the X-axis. This area is the cross-sectional area $S_a$ of the permeable cell wall 21. In other words, $S_a$ is a sum of cross-sectional areas of permeable cell walls 21 in an arbitrary cross section orthogonal to the axial direction of the filter 1.

On the other hand, the cross section of an impermeable cell walls 22 is a coarse oblique line hatched region that extends parallel to the Y-axis. This area is the cross-sectional area $S_2$ of the impermeable cell wall 22. In other words, $S_b$ is a sum of cross-sectional areas of impermeable cell wall 22 in an arbitrary cross section orthogonal to the axial direction of the filter 1.

Preferably, the relationship of $S_a>S_b$ is satisfied in a cross section of the filter 1 orthogonal to the axial direction at an arbitrary axial position. This can reduce the volume occupied by the impermeable cell walls 22 in the filter 1, thereby alleviating a gas flow inhibited by the impermeable cell walls 22, which the gas hardly permeates through. This makes it possible to further reduce pressure loss. In addition, the PM in the exhaust gas G is collected by the permeable cell walls 21, thus this can prevent the collection ratio from dropping even if the area occupied by the impermeable cell walls 22 are relatively reduced as described above. In other words, pressure loss can be reduced while preventing a drop in the collection ratio.

Figure 25:
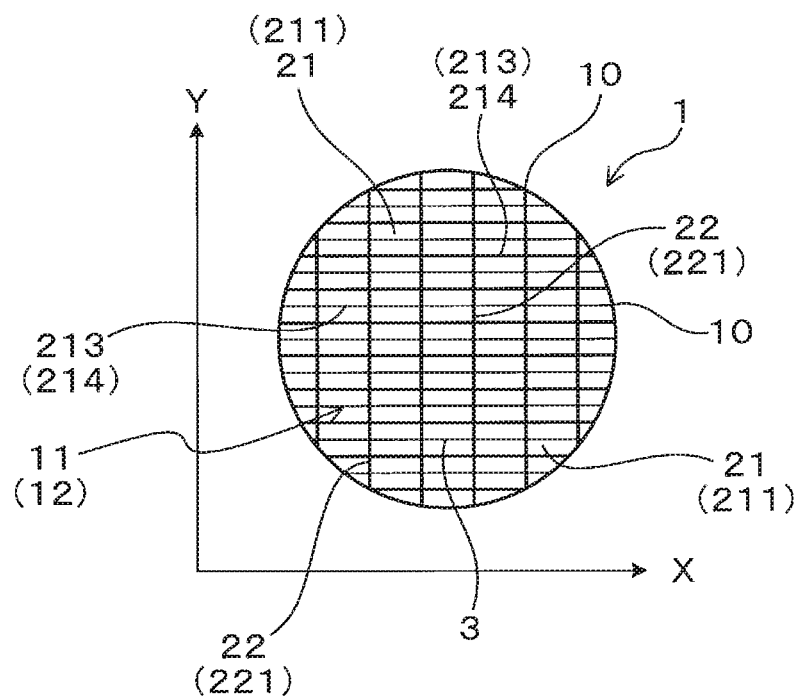
FIG. 25 is a front view of an end surface of a porous honeycomb filter of a sixth embodiment.

To satisfy the relationship of $S_a>S_b$, for example, the number of the impermeable cell walls can be smaller than the number of the permeable cell walls. An example is shown in FIG. 25. FIG. 25 shows a front view of end surfaces 11, 12 of the filter 1. In FIG. 25, among the lines extending parallel to the X-axis, the thick lines represent connecting parts 213, 214 that are present on a front side in the direction orthogonal to the page, while the thin lines represent connecting parts 213, 214 that are present on a rear side in the direction orthogonal to the page. In the inflow end surface 11 and the outflow end surface 12, the thick lines and thin lines extending parallel to the X-axis direction are shifted by a half pitch, but they are substantially equivalent.

Similar to the filter of the first embodiment, the filter 1 illustrated in FIG. 25 has a cell 3 whose XY cross section has a quadrilateral outer edge. A pair of opposing cell walls 2 are formed by inclined walls 211 extending inclined relative to the axial direction Z. The inclined walls 211 each serve as a permeable cell wall 21. On the other hand, the remaining two opposing cell walls 2 are formed by support walls 221 extending parallel to the axial direction Z, and this support walls 221 each serve as the impermeable cell wall 22.

As illustrated in FIG. 25, the permeable cell walls 21 and the impermeable cell walls 22, for example, orthogonal to each other. A cell 3 surrounded by these permeable cell walls 21 and impermeable cell walls 22 has a quadrilateral outer edge on the end surfaces 11, 12. The filter 1 of the present embodiment has impermeable cell walls 22 fewer than permeable cell walls 21, the impermeable cell walls 22 linearly partitioning the inside of a tubular outer shell 10 at the end surfaces 11, 12. As a result, the opening of the cell 3 on the inflow end surface 11 and the outflow end surface 12 is rectangular as illustrated in FIG. 25.

Reducing the number of impermeable cell walls 22 as described above can satisfy the relationship of $S_a>S_b$, thereby reducing the volume occupied by the impermeable cell walls 22 in the filter 1 and alleviating the gas flow inhibited by the impermeable cell walls 22. This makes it possible to reduce pressure loss, and additionally, increasing, for example, the opening area of the cell 3 on the inflow end surface 11. In such terms, further reduction in pressure loss can be made possible. In addition, the number of the impermeable cell walls 22 can be adjusted within the range in which the desired strength can be maintained.

As another configuration to satisfy the relationship of $S_a>S_b$, for example, thickness $T_2$ of the impermeable cell wall 22 can be made smaller than thickness $T_1$ of the permeable cell wall 21 in a cross section of the filter 1 taken along a direction orthogonal to the axial direction Z. In other words, the relationship $T_1<T_2$ has only to be satisfied. This can also reduce the area occupied by the impermeable cell wall 22 in the filter 1, and in turn further reduce pressure loss.

To satisfy the relationship of $S_a > S_b$ as in the present embodiment, it is particularly preferable to form the impermeable cell wall 22 of material that is stronger per unit thickness than the permeable cell wall 21. This makes the impermeable cell wall 22 stronger, and therefore further prevents the same from becoming weaker even with fewer impermeable cell walls 22. This enables less pressure loss while further preventing the deterioration in strength at the same time. Other configurations and operational effects are the same as those of the first embodiment.

Comparative The First Embodiment

Figure 26:
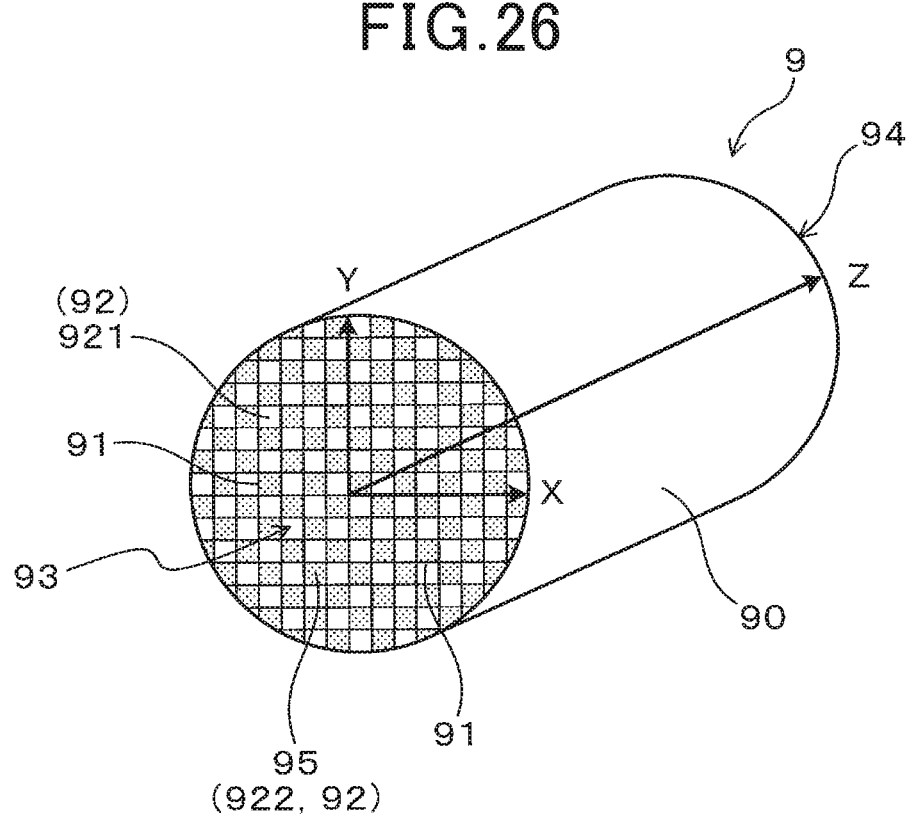
FIG. 26 is a perspective view of the porous honeycomb filter of Comparative the first embodiment.
Figure 27:
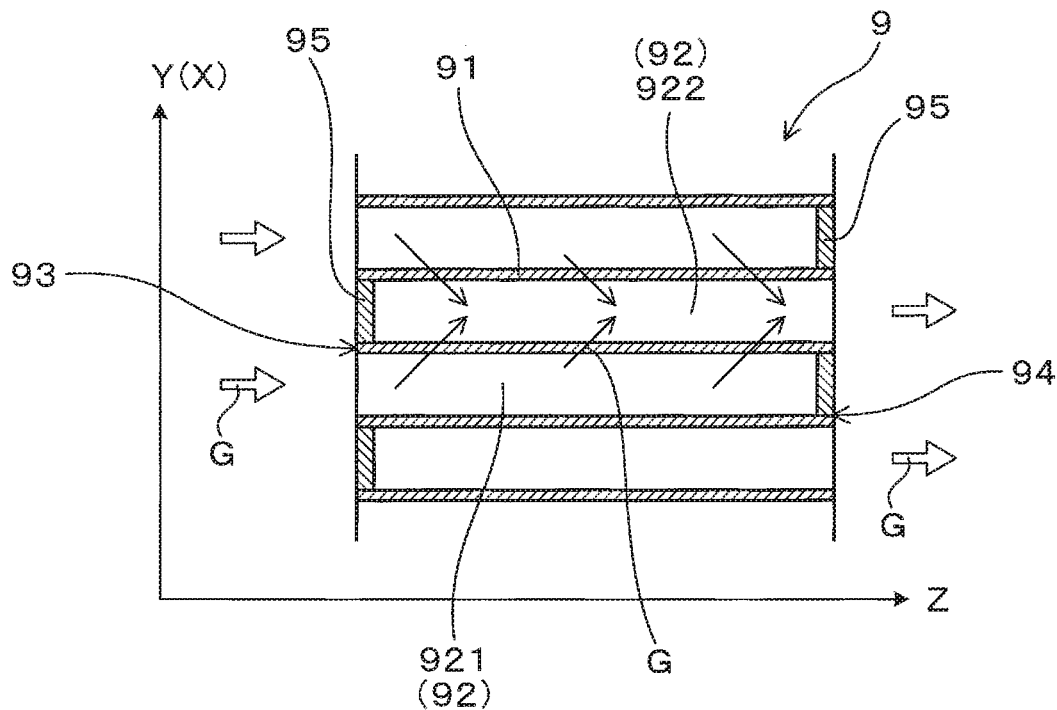
FIG. 27 is a cross-sectional view taken along a section parallel to the axial direction of the porous honeycomb filter of a first comparative embodiment.

Now a description will be given of an example of a porous honeycomb filter for comparison with each embodiment. As illustrated in FIGS. 26 and 27, the filter 9 of the present embodiment does not have an inclined wall extending inclined relative to the axial direction Z. The filter 9 has a tubular outer shell 90, a cell wall 91 that partitions the inside of the outer shell, and a cell 92 that is surrounded by the cell walls 91 to form a gas flow passage extending in the axial direction Z of the tubular outer shell. Each cell 92 is surrounded by four cell walls 91 and has two pairs of opposing cell walls 91 that are orthogonal to each other. The cell 92 in a cross section orthogonal to the axial direction Z is quadrilateral, more specifically quadrate.

One of both end surfaces 93, 94 in the axial direction Z of each cell 92 is closed by a closing member 95 that does not allow gas to permeate. A cell 92 provided with the closing member 95 on the outflow end surface 94 is open on the inflow end surface 93 to serve as an inflow cell 921 into which exhaust gas flows. On the other hand, a cell 92 provided with a closing member 95 on the inflow end surface 93 is open on the outflow end surface 94 to serve as an outflow cell 922 out of which exhaust gas flows.

The inflow cells 921 and the outflow cells 922 are alternately adjacent to each other. An inflow cell 921 and outflow cell 922 that are adjacent to each other share one cell wall 91. The exhaust gas flowing into the inflow cell 921 passes through a cell wall 91 shared by the inflow cell 921 and the outflow cell 922 to reach the outflow cell 922. Exhaust gas G passes through the outflow cell 922 to be discharged from the outflow end surface 94. The filter 9 of the present embodiment has practically no impermeable cell walls shown in the above embodiments, and all the cell walls 91 forming each cell 92 transmit exhaust gas.

In the filter 9 of the present embodiment, the cell walls 91 extend parallel to the axial direction Z, and the cells 92 surrounded by the cell walls 91 are alternately closed on the both end surfaces 93, 94 as described above. In the inflow end surface 93, therefore, half of all the cells 92 are open, and the remaining half are closed by the closing members 95. This creates more pressure loss on the inflow end surface 93 than the embodiment described above. Half of the cells 92 are open and the remaining half are closed on the outflow end surface 94 as well.

In FIG. 27, flow rates of the exhaust gas G passing through the cell walls 91 are indicated by the length of arrows passing thereacross. The flow rate of the exhaust gas G passing through the cell walls 91 is referred to as a wall permeation flow rate. As illustrated in the same figure, the wall permeation flow rate increases as the exhaust gas G approaches the inflow end surface 93 and outflow end surface 94 provided with the closing members 95, and wall permeation flow rate drops at the center of the axial direction Z of the filter 9. This results in more varied wall permeation flow rates, and in turn more pressure loss.

Experimental Example

In the present example, wall permeation flow rates of three kinds of porous honeycomb filters each having an inclined wall formed in the same pattern as the Embodiments 1 to 3 will be measured by simulation and compared with the porous honeycomb filter of Comparative Embodiment 1.

A sample E1 corresponds to the filter of the first embodiment, which is the filter 1 whose inclined walls 211 are inclined linearly and continuously from the inflow end surface 11 to the outflow end surface 12, and the opposing inclined walls 211 are directly connected to each other on one of the both end surfaces 11, 12 (see FIGS. 1 to 9). The actual shape and dimensions of the sample E1 used in the measurement of the wall permeation flow rate in the present example are as follows.

The filter 1 of the sample E1 is cylindrical. The diameter Φ of the filter is 118.4 mm and the length of the axial direction Z is 118.4 mm. The thickness of each cell wall 2, i.e., thickness $T_1$ of each inclined wall 211 and thickness $T_2$ of each support wall 221 are both 0.203 mm (see FIGS. 9 and 3). The thickness $T_3$ in the Y-axis direction in the connecting parts 213, 214 of the inclined wall 211 is 0.444 mm, and width $W_1$ in the axial direction Z of the connecting parts 213, 214 is 0.200 mm (see FIG. 9). The inclination angle θ of the inclined wall 211, i.e., the angle θ formed by the inclined wall 211 and the axial direction Z is 0.97° (see FIG. 9). The outer edge of each cell 3 is square on end surfaces 11, 12, and the length $L_1$ of one side of the outer edge is 1.576 mm (see FIG. 4).

Figure 28:
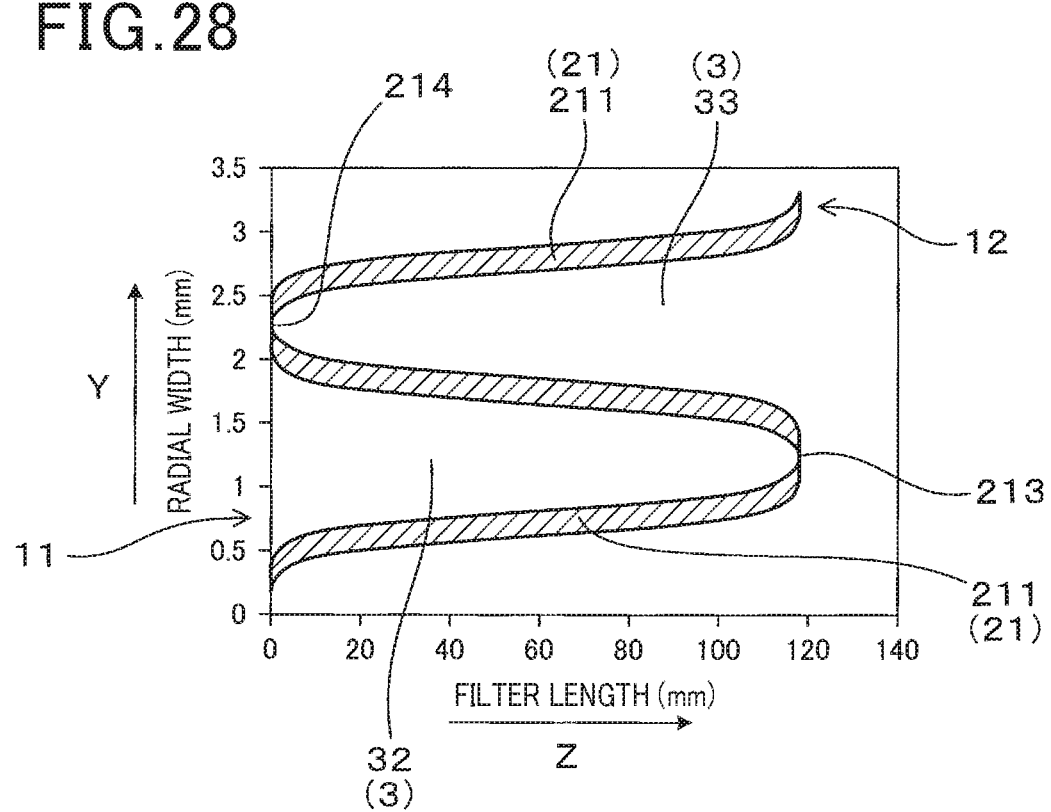
FIG. 28 is an explanatory drawing of a cross-sectional view of an inclined wall in the porous honeycomb filter of sample E2 in an experimental example.

A sample E2 corresponds to the filter of the second embodiment, which is the filter 1 whose inclined walls 211 are curvilinearly inclined relative to the both end surfaces 11, 12 of the axial direction Z and have curved connecting parts 213, 214. FIG. 28 shows an actual formation pattern of the inclined wall 211 in the sample E2 used to measure the wall permeation flow rate. In FIG. 28, the horizontal axis indicates the length of the filter from the inflow end surface 11 to the outflow end surface 12 in the axial direction Z. The vertical axis indicates a radial width, and more specifically, for example, the distance in the Y-axis direction from any inflow-side connecting part 214 located at the center. In FIG. 28, the connecting parts 213, 214 become thin but the thickness thereof can be changed arbitrarily. Other shapes and dimensions are the same as those of the sample E1.

A sample E3 corresponds to the filter of the third embodiment, which is the filter 1 whose inclined walls 211 are connected to each other and closed more inner than the end surfaces 11, 12 in the axial direction (see FIG. 20). The dimensions of the sample E3 used to measure the wall permeation flow rate are as follows. The distance in the axial direction Z between the inflow-side connecting part 214 and the outflow-side connecting part 213, i.e., the axial length of the area in which the inclined walls 211 are formed, is 108.4 mm, while the length of the inflow-side parallel wall 215 and the length of the outflow-side parallel wall 216 are both 5.0 mm. The angle formed by the inclined walls 211 and the axial direction Z, i.e., the inclination angle, is 1.06°. In the sample E3, a non-communication area Anc is 5.0 mm long and a communication area Ac is 108.4 mm long (see FIG. 20). Other shapes and dimensions are the same as those of the sample E1.

A sample C1 corresponds to the filter of Comparative Embodiment 1, which is the filter 9 in which all the cell walls extend parallel to the axial direction and each cell is closed alternately by a closing member at both ends (see FIGS. 26 and 27). The respective dimensions in the sample C1 used to measure a wall permeation flow rate are the same as those in sample E1 except that there is no inclined wall.

The dimensions of the samples E1 to E3 are representative examples. The dimensions of the filter 1 are not limited to those but can be changed as appropriate. The relationship between the axial distance from the inflow end surface and the wall permeation flow rate of each filter sample is measured by simulation. The conditions for measuring the simulation are as follows. Gas flow rate: 32 m$^3$/min, temperature: 900° C., upstream pressure: 60 kPa. The results are shown in FIG. 29.

As in the sample C1, the filter 9, which has no inclined wall, all the cell walls 91 extend parallel to the axial direction Z, and each cell 92 is closed by the closing member 95 provided at one of the end surfaces 93 and 94, provides a more varied wall permeation flow rate as shown in FIG. 29 (see FIGS. 26 and 27). Specifically, the wall permeation flow rate increases as the exhaust gas G approaches the inflow end surface 93 and the outflow end surface 94, peaking on each thereof, while it is minimized at the center of the axial direction Z. The sample C1 shows a large difference between the minimum and maximum values of the wall permeation flow rate, which means a more varied wall permeation flow rate. This creates more pressure loss.

On the other hand, the filter 1 having permeable cell walls 21 each including an inclined wall 211 and impermeable cell walls 22 each including a support wall 221, as in the samples E1 to E3, provides a wall permeation flow rate that is less varied than the sample C1 described above, which reduces the pressure loss. As understood from FIG. 29, comparing the samples E1 to E3 shows that the wall permeation flow rate is less varied in the order of the sample E3, the sample E1, and the sample E2.

As illustrated in FIG. 20, the opening area of the inflow end surface 11 is larger in the filter 1 of the sample E3 whose inclined walls 211 are connected to each other and closed more inner than the end surfaces 11, 12 in the axial direction Z, as described above, than in the filter 1 of the sample E1 whose inclined walls 211 are closed at the end surfaces 11, 12. As shown in FIG. 29, the wall permeation flow rate of the inflow end surface 11 is lower in the sample E3. On the other hand, inclined walls 211 are more inclined in the sample E3 than in the sample E1, and therefore the wall permeation flow rate at the center of the axial direction Z is higher in the sample E3. As a result, the sample E1 provides a less varied wall permeation flow rate than the sample E3.

The sample E2 provides a constant wall permeation flow rate, which is practically unvaried. The sample E2 can therefore create the least pressure loss among the samples E1 to E3.

Although the present disclosure is described in accordance with the embodiments described above, it is understood that the present disclosure is not limited to these embodiments. The disclosure also encompasses various modified examples and variations that come within the range of equivalence. In addition, various combinations or embodiments, including other combinations and embodiments which includes only one element, or more, or less, are within the scope and idea of the present disclosure.

The configurations of the first embodiment 1 to the sixth embodiment described above can be combined as appropriate. For example, the second embodiment and the third embodiment can be combined to form connecting parts 213, 214 of a curvilinearly inclined wall axially inside. In addition, the second embodiment and the fourth embodiment can be combined to connect a pair of curvilinearly inclined walls via a connecting member at a connecting part.

The invention claimed is:

1. A porous honeycomb filter comprising:
   a porous first cell wall that permits exhaust gas to permeate;
   a second cell wall that permits the exhaust gas to permeate less easily than the first cell wall; and
   a cell that is surrounded by the first cell wall and the second cell wall to form an extending gas flow passage, wherein
   the second cell wall has a smaller porosity than the first cell wall,
   the cell comprises a plurality of cells,
   the porous honeycomb filter further comprising a tubular outer shell constituting an outer periphery thereof,
   a plurality of the first cell walls and a plurality of the second cell walls partition an inside of the tubular outer shell into the cells,
   the first cell walls include an inclined wall extending inclined relative to an axial direction of the tubular outer shell, and the second cell walls include a parallel wall extending parallel to the axial direction.

2. The porous honeycomb filter according to claim 1, wherein,
   in a cross section of the porous honeycomb filter in the direction orthogonal to the axial direction, a cross-sectional area $S_a$ occupied by a plurality of the first cell walls and a cross-sectional area $S_b$ occupied by a plurality of the second cell walls satisfy the following condition:

$S_a > S_b$.

3. The porous honeycomb filter according to claim 2, wherein
   the number of the second cell walls is fewer than the number of the first cell walls.

4. The porous honeycomb filter according to claim 2, wherein
   a thickness $T_1$ of each first cell wall and a thickness $T_2$ of each second cell wall satisfy the following condition:

$T_1 < T_2$.

5. The porous honeycomb filter according to claim 1, wherein
   the first cell walls include a pair of the inclined walls that face each other, and an inclination direction of one of the inclined walls of the pair is symmetrical to an inclination direction of the other of the inclined walls of the pair with respect to the axial direction.

6. The porous honeycomb filter according to claim 5, wherein:
   the porous honeycomb filter has an inflow end surface into which the exhaust gas flows and an outflow end surface out of which the exhaust gas flows, the inflow end surface and the outflow end surface being respectively arranged at opposite ends of the axial direction;
   the cells include:
   a reduction cell having a gas flow passage cross-sectional area that decreases from the inflow end surface toward the outflow end surface, and an enlargement cell having a gas flow passage cross-sectional area that increases from the inflow end surface toward the outflow end surface of the cell; and the reduction cell and the enlargement cell are arranged adjacent to each other to share one of the inclined walls.

7. The porous honeycomb filter according to claim 6, wherein the reduction cell comprises reduction cells that are adjacent to each other via one of the parallel walls, and the enlargement cell comprises enlargement cells that are adjacent to each other via one of the parallel walls.

8. The porous honeycomb filter according to claim 6, further comprising an outflow-side connecting part that connects the pair of inclined walls constituting the reduction cell directly or via a connecting member; and an inflow-side connecting part connects the pair of inclined walls constituting the enlargement cell directly or via the connecting member.

9. The porous honeycomb filter according to claim 8, wherein the connecting member is comprised of a constituent member identical to the inclined wall.

10. The porous honeycomb filter according to claim 8, wherein:

the outflow-side connecting part is formed on the outflow end surface in the axial direction; and the inflow-side connecting part is formed on the outflow end surface in the axial direction.

11. The porous honeycomb filter according to claim 8, wherein:

the outflow-side connecting part is disposed to be more inner in the axial direction than the outflow end surface; and the inflow-side connecting part is disposed to be more inner in the axial direction than the inflow end surface.

12. The porous honeycomb filter according to claim 8, wherein the inclined wall is inclined linearly between the inflow-side connecting part and outflow-side connecting part.

13. The porous honeycomb filter according to claim 8, wherein:

the inclined wall extending in the axial direction has an inflow-side curvilinearly inclined area that is curvilinearly inclined toward the inflow end surface side and an outflow-side curvilinearly inclined area that is curvilinearly inclined toward the outflow end surface side;

in the reduction cell, the pair of inclined walls are connected to each other in the outflow-side curvilinearly inclined area to form the outflow-side connecting part; and in the enlargement cell, the pair of inclined walls are connected to each other in the inflow-side curvilinearly inclined area to form the inflow-side connecting part.

14. The porous honeycomb filter according to claim 13, wherein, in each of the outflow-side connecting part and the inflow-side connecting part, an inclination direction of one of the inclined walls of the pair is symmetrical to the inclination direction of the other of the inclined walls of the pair with respect to the axial direction.

15. The porous honeycomb filter according to claim 6, wherein each of the second cell walls has an axial end part, and the axial end part is disposed to be more inner in the axial direction than the inflow end surface and the outflow end surface of the porous honeycomb filter.

16. The porous honeycomb filter according to claim 1, wherein the cells include adjacent cells adjacent to each other via one of the first cell walls, each of the adjacent cells via one of the first cell walls has a gas flow passage cross-sectional area at any arbitrary position in an axial direction of the tubular outer shell, and the gas flow passage cross-sectional area of one of the adjacent cells via one of the first cell walls is different from the gas flow passage cross-sectional area of the other of the adjacent cells.

17. The porous honeycomb filter according to claim 1, wherein the cells include adjacent cells adjacent to each other via one of the second cell walls, each of the adjacent cells via one of the second cell walls has a gas flow passage cross-sectional area at any arbitrary position in an axial direction of the tubular outer shell, and the gas flow passage cross-sectional area of one of the adjacent cells via one of the second cell walls is identical to the gas flow passage cross-sectional area of the other of the adjacent cells.

18. The porous honeycomb filter according to claim 1, wherein the second cell wall is made of a material that is stronger per unit thickness than a material of the first cell wall.

19. The porous honeycomb filter according to claim 1, wherein the first cell wall and the second cell wall are each made of a ceramic material whose main component is cordierite crystalline phase.

20. The porous honeycomb filter according to claims 1, further comprising:

an exhaust gas purification catalyst supported by the first cell wall and second cell wall, wherein:

the exhaust gas purification catalyst is supported inside the first cell wall; and the exhaust gas purification catalyst is supported on a surface of the second cell wall, the surface facing the gas flow passage.

21. A porous honeycomb filter comprising:

a porous first cell wall that permits exhaust gas to permeate;

a second cell wall that permits the exhaust gas to permeate less easily than the first cell wall; and a cell that is surrounded by the first cell wall and the second cell wall to form an extending gas flow passage, wherein the second cell wall has a smaller porosity than the first cell wall, the cell comprises a plurality of cells, the porous honeycomb filter further comprising a tubular outer shell constituting an outer periphery thereof, a plurality of the first cell walls and a plurality of the second cell walls partition an inside of the tubular outer shell into the cells, in a cross section of the porous honeycomb filter in the direction orthogonal to the axial direction of the tubular outer shell, a cross-sectional area $S_a$ occupied by a plurality of the first cell walls and a cross-sectional area $S_b$ occupied by a plurality of the second cell walls satisfy the following condition:

$S_a > S_b$, the number of the second cell walls is fewer than the number of the first cell walls.

22. The porous honeycomb filter according to claim 21, wherein a thickness $T_1$ of each first cell wall and a thickness $T_2$ of each second cell wall satisfy the following condition:

$T_1 < T_2$.

23. A porous honeycomb filter comprising:
a porous first cell wall that permits exhaust gas to permeate;
a second cell wall that permits the exhaust gas to permeate less easily than the first cell wall; and
a cell that is surrounded by the first cell wall and the second cell wall to form an extending gas flow passage, wherein
the second cell wall has a smaller porosity than the first cell wall,
the cell comprises a plurality of cells,
the porous honeycomb filter further comprising a tubular outer shell constituting an outer periphery thereof,
a plurality of the first cell walls and a plurality of the second cell walls partition an inside of the tubular outer shell into the cells,
in a cross section of the porous honeycomb filter in the direction orthogonal to the axial direction of the tubular outer shell, a cross-sectional area $S_a$ occupied by a plurality of the first cell walls and a cross-sectional area $S_b$ occupied by a plurality of the second cell walls satisfy the following condition:

$S_a > S_b$, a thickness $T_1$ of each first cell wall and a thickness $T_2$ of each second cell wall satisfy the following condition:

$T_1 < T_2$.

* * * * *